United States Patent
Takeda

(10) Patent No.: US 10,773,343 B2
(45) Date of Patent: Sep. 15, 2020

(54) LASER MACHINING APPARATUS THAT IRRADIATES LASER BEAM FOR MACHINING SURFACE OF WORKPIECE

(71) Applicant: BROTHER KOGYO KABUSHIKI KAISHA, Nagoya, Aichi (JP)

(72) Inventor: Hitoshi Takeda, Nagoya (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 370 days.

(21) Appl. No.: 15/686,869

(22) Filed: Aug. 25, 2017

(65) Prior Publication Data
US 2017/0348801 A1 Dec. 7, 2017

Related U.S. Application Data

(63) Continuation of application No. PCT/JP2016/055816, filed on Feb. 26, 2016.

(30) Foreign Application Priority Data

Feb. 27, 2015 (JP) ................................. 2015-038614

(51) Int. Cl.
*B23K 26/362* (2014.01)
*B23K 26/082* (2014.01)
(Continued)

(52) U.S. Cl.
CPC ........ *B23K 26/362* (2013.01); *B23K 26/0006* (2013.01); *B23K 26/0622* (2015.10);
(Continued)

(58) Field of Classification Search
CPC . B23K 26/362; B23K 26/082; B23K 26/0626
(Continued)

(56) References Cited

U.S. PATENT DOCUMENTS

2008/0023455 A1* 1/2008 Idaka .................. B23K 26/082
219/121.73
2016/0114431 A1* 4/2016 Cheverton ........... B23K 26/342
219/76.1

FOREIGN PATENT DOCUMENTS

JP  2001-018078 A  1/2001
JP  2003-048088 A  2/2003
(Continued)

OTHER PUBLICATIONS

International Search Report issued in the corresponding international application No. PCT/JP2016/055816 dated May 31, 2016.
(Continued)

*Primary Examiner* — Thien S Tran
(74) *Attorney, Agent, or Firm* — K&L Gates LLP

(57) ABSTRACT

In a laser machining apparatus, a controller is configured to perform: supplying an initial drive current to a pump light emitting device during an initial drive current supply period; controlling a scanner to start scanning a laser beam emitted from a laser beam emitting device after a standby period has elapsed from a start of supplying the initial drive current; and supplying a prescribed drive current to the pump light emitting device after the initial drive current supply period has elapsed, a prescribed drive current value being smaller than an initial drive current value, the pump light emitting device emitting the pump light having prescribed light intensity upon receipt of the prescribed drive current, the laser beam emitting device emitting the laser beam having prescribed beam intensity when the pump light having the prescribed light intensity is incident upon the laser beam emitting device.

11 Claims, 13 Drawing Sheets

(51) Int. Cl.
*B23K 26/60* (2014.01)
*B23K 26/359* (2014.01)
*B23K 26/00* (2014.01)
*B23K 26/0622* (2014.01)
*B23K 26/361* (2014.01)
*B23K 26/06* (2014.01)
*B23K 103/10* (2006.01)
*B23K 103/04* (2006.01)

(52) U.S. Cl.
CPC ........ *B23K 26/0626* (2013.01); *B23K 26/082* (2015.10); *B23K 26/359* (2015.10); *B23K 26/361* (2015.10); *B23K 26/60* (2015.10); *B23K 2103/04* (2018.08); *B23K 2103/10* (2018.08)

(58) Field of Classification Search
USPC ................. 219/76.1, 121.62, 121.65, 121.73
See application file for complete search history.

(56) References Cited

FOREIGN PATENT DOCUMENTS

| JP | 2004-174539 A | | 6/2004 |
|----|---------------|---|--------|
| JP | 2004-337970 A | | 12/2004 |
| JP | 2008-155538 A | | 7/2008 |
| JP | 2012-044098 A | | 3/2012 |
| JP | 2012044098 A | * | 3/2012 |

OTHER PUBLICATIONS

Written Opinion issued in the corresponding international application No. PCT/JP2016/055816 dated May 31, 2016.

* cited by examiner

FIG. 7

| WORKPIECE: STEEL ||||||
| SCANNING SPEED | FIRST CURRENT VALUE | SECOND CURRENT VALUE | THIRD CURRENT VALUE | THIRD CURRENT SUPPLY PERIOD | STANDBY PERIOD |
| --- | --- | --- | --- | --- | --- |
| 300 | 15000 | 32500 | 42000 | 3.0 | 0.2 |

| WORKPIECE: ALUMINUM ||||||
| SCANNING SPEED | FIRST CURRENT VALUE | SECOND CURRENT VALUE | THIRD CURRENT VALUE | THIRD CURRENT SUPPLY PERIOD | STANDBY PERIOD |
| --- | --- | --- | --- | --- | --- |
| 300 | 15000 | 32500 | 42000 | 2.7 | 0.2 |
| 600 | 15000 | 32500 | 42000 | 2.7 | 0.2 |
| 900 | 15000 | 32500 | 42000 | 2.7 | 0.2 |
| 1200 | 15000 | 32500 | 42000 | 3.7 | 0.2 |
| 1500 | 15000 | 32500 | 42000 | 3.7 | 0.2 |
| ⋮ | ⋮ | ⋮ | ⋮ | ⋮ | ⋮ |

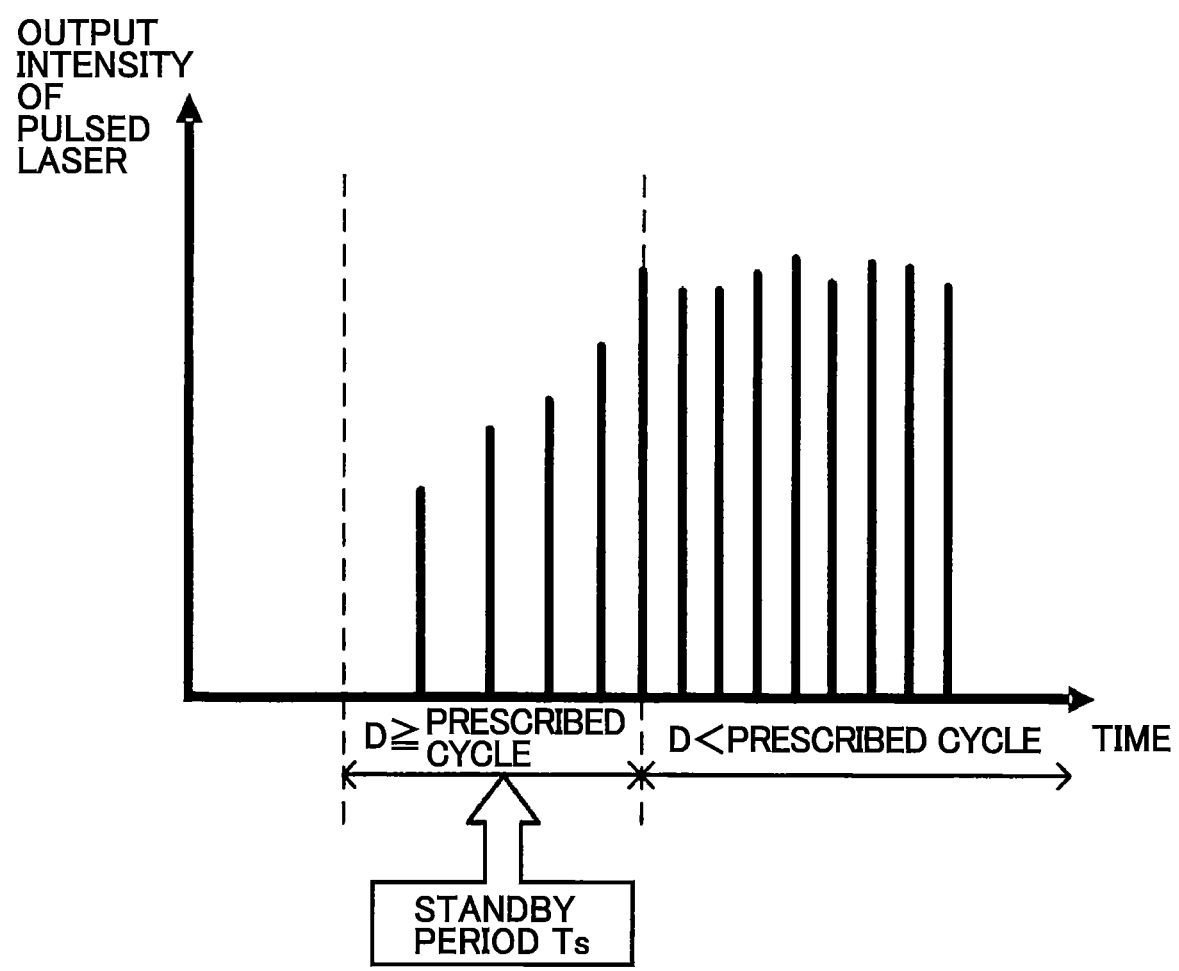

LASER MACHINING APPARATUS THAT IRRADIATES LASER BEAM FOR MACHINING SURFACE OF WORKPIECE

CROSS REFERENCE TO RELATED APPLICATION

This application is a continuation application of International Application No. PCT/JP2016/055816 filed Feb. 26, 2016 in the Japan Patent Office acting as Receiving Office, claiming priority from Japanese Patent Application No. 2015-038614 filed Feb. 27, 2015. The entire contents of each of these applications are incorporated herein by reference.

TECHNICAL FIELD

The present disclosure relates to a laser machining apparatus that irradiates a laser beam for machining a surface of a workpiece.

BACKGROUND

A conventional laser machining apparatus is configured to machine a workpiece by irradiating a laser beam thereon. The irradiated laser beam is progressively scanned to irradiate desired positions on the workpiece in order to machine patterns depicting characters, symbols, and the like.

One such laser machining apparatus known in the art is provided with a laser beam emitting device and a pump light emitting device. In this laser machining apparatus, the pump light emitting device is configured to emit pump light corresponding to a magnitude of a drive current when the drive current is supplied to the pump light emitting device. The laser beam emitting device is configured to transit from a ground state to a pumped state to emit a laser beam for machining the workpiece when the pump light is incident upon the laser beam emitting device.

Since this transition from the ground state to the pumped state and other processes require some time, this type of a laser machining apparatus may experience a time lapse after the drive current is first supplied and before a laser beam having desired output intensity is emitted and, hence, the output intensity of the laser beam may not be sufficiently strong at the start of the machining process. Such insufficient laser output intensity at the start of the machining process may lead to a decline in machining quality. For example, the laser beam may be unable to machine the laser irradiation start portion or may produce an insufficient depth of cut at the start of the machining process.

In order to address these shortcomings, a laser machining apparatus disclosed in Japanese Patent Application Publication No. 2004-337970 first supplies an initial drive current corresponding to laser output intensity higher than a prescribed laser output intensity to exciting means (an example of the pump light emitting device), and subsequently supplies a drive current corresponding to the prescribed laser output intensity to the exciting means. The laser machining apparatus disclosed in the above-stated literature reduces the time period required for the laser beam emitting device to transit to the pumped state and to output a laser beam having the desired output intensity by first supplying the initial drive current. Further, since the rising time of the laser output intensity is improved, the laser machining apparatus can suppress a decline in machining quality caused by the insufficient laser output intensity at the start of the machining process.

SUMMARY

However, while the laser machining apparatus disclosed in the above-stated literature can reduce the time period required to output a laser beam having the desired output intensity for machining the workpiece by supplying the initial drive current to the exciting means, the conventional laser machining apparatus cannot eliminate this time period entirely. In other words, the laser machining apparatus disclosed in the above-stated literature still experiences a time lapse after supply of the initial drive current is started and before the laser output intensity reaches the desired value.

The laser machining apparatus disclosed in the above-stated literature also begins scanning the laser beam with a galvano mirror device (an example of a scanner) while simultaneously initiating supply of the initial drive current to the exciting means. In other words, there is still a decline in machining quality of the laser irradiation start portion machined with this laser machining apparatus, although less than earlier conventional devices, because the laser beam scanned by the galvano mirror device, while having higher output intensity than previous laser machining apparatuses, has not yet reached the desired output intensity. Further, if the interval between the start of supplying the initial drive current and the start of scanning with the galvano mirror device is lengthened too much, the laser irradiation start portion may be locally cut too deeply, thereby leading to a decline in overall machining quality.

In view of the foregoing, it is an object of the present disclosure to provide a laser machining apparatus that irradiates a laser beam for machining the surface of a workpiece and that is capable of suppressing a decline in machining quality of the laser irradiation start portion at the start of the machining process with the laser beam.

In order to attain the above and other objects, the present disclosure provides a laser machining apparatus including a pump light emitting device; a laser beam emitting device; a scanner; and a controller. The pump light emitting device is configured to emit pump light upon receipt of a drive current. The pump light has intensity corresponding to a current value of the drive current. The laser beam emitting device is configured to transit to a pumped state to emit a laser beam for machining a workpiece when the pump light is incident from the pump light emitting device. The laser beam emitting device is configured to emit the laser beam having prescribed beam intensity during machining the workpiece. The scanner is configured to scan the laser beam emitted from the laser beam emitting device at a scanning speed. The controller is configured to perform: supplying an initial drive current having an initial drive current value to the pump light emitting device during an initial drive current supply period, the pump light emitting device emitting the pump light having initial light intensity upon receipt of the initial drive current; controlling the scanner to start scanning the laser beam after a standby period has elapsed from a start of supplying the initial drive current, the standby period being shorter than the initial drive current supply period; and supplying a prescribed drive current having a prescribed drive current value to the pump light emitting device after the initial drive current supply period has elapsed, the prescribed drive current value being smaller than the initial drive current value, the pump light emitting device emitting the pump light having prescribed light intensity upon receipt of the prescribed drive current, the laser beam emitting device emitting the laser beam having the prescribed beam intensity when the pump light having the prescribed light intensity is incident upon the laser beam emitting device.

According to another aspect, the present disclosure provides a non-transitory computer readable storage medium storing a set of program instructions for a laser machining apparatus. The laser machining apparatus includes: a pump light emitting device; a laser beam emitting device; a scanner; and a controller. The pump light emitting device is configured to emit pump light upon receipt of a drive current. The pump light has intensity corresponding to a current value of the drive current. The laser beam emitting device is configured to transit to a pumped state to emit a laser beam for machining a workpiece when the pump light is incident from the pump light emitting device. The laser beam emitting device is configured to emit the laser beam having prescribed beam intensity during machining the workpiece. The scanner is configured to scan the laser beam emitted from the laser beam emitting device. The set of program instructions, when executed by the controller, causes the laser machining apparatus to perform: supplying an initial drive current having an initial drive current value to the pump light emitting device during an initial drive current supply period, the pump light emitting device emitting the pump light having initial light intensity upon receipt of the initial drive current; controlling the scanner to start scanning the laser beam after a standby period has elapsed from a start of supplying the initial drive current, the standby period being shorter than the initial drive current supply period; and supplying a prescribed drive current having a prescribed drive current value to the pump light emitting device after the initial drive current supply period has elapsed, the prescribed drive current value being smaller than the initial drive current value, the pump light emitting device emitting the pump light having prescribed light intensity upon receipt of the prescribed drive current, the laser beam emitting device emitting the laser beam having the prescribed beam intensity when the pump light having the prescribed light intensity is incident upon the laser beam emitting device.

According to still another aspect, the present disclosure provides a method for controlling a laser machining apparatus. The laser machining apparatus includes: a pump light emitting device; a laser beam emitting device; a scanner; and a controller. The pump light emitting device is configured to emit pump light upon receipt of a drive current. The pump light has intensity corresponding to a current value of the drive current. The laser beam emitting device is configured to transit to a pumped state to emit a laser beam for machining a workpiece when the pump light is incident from the pump light emitting device. The laser beam emitting device is configured to emit the laser beam having prescribed beam intensity during machining the workpiece. The scanner is configured to scan the laser beam emitted from the laser beam emitting device. The method includes: supplying an initial drive current having an initial drive current value to the pump light emitting device during an initial drive current supply period, the pump light emitting device emitting the pump light having initial light intensity upon receipt of the initial drive current; controlling the scanner to start scanning the laser beam after a standby period has elapsed from a start of supplying the initial drive current, the standby period being shorter than the initial drive current supply period; and supplying a prescribed drive current having a prescribed drive current value to the pump light emitting device after the initial drive current supply period has elapsed, the prescribed drive current value being smaller than the initial drive current value, the pump light emitting device emitting the pump light having prescribed light intensity upon receipt of the prescribed drive current, the laser beam emitting device emitting the laser beam having the prescribed beam intensity when the pump light having the prescribed light intensity is incident upon the laser beam emitting device.

BRIEF DESCRIPTION OF THE DRAWINGS

The particular features and advantages of the disclosure as well as other objects will become apparent from the following description taken in connection with the accompanying drawings, in which:

FIG. 7 is an explanatory diagram illustrating an example of a content in a supply current control database;

FIG. 13 is an explanatory diagram illustrating determination of a standby period in the second embodiment.

DETAILED DESCRIPTION

Figure 1:
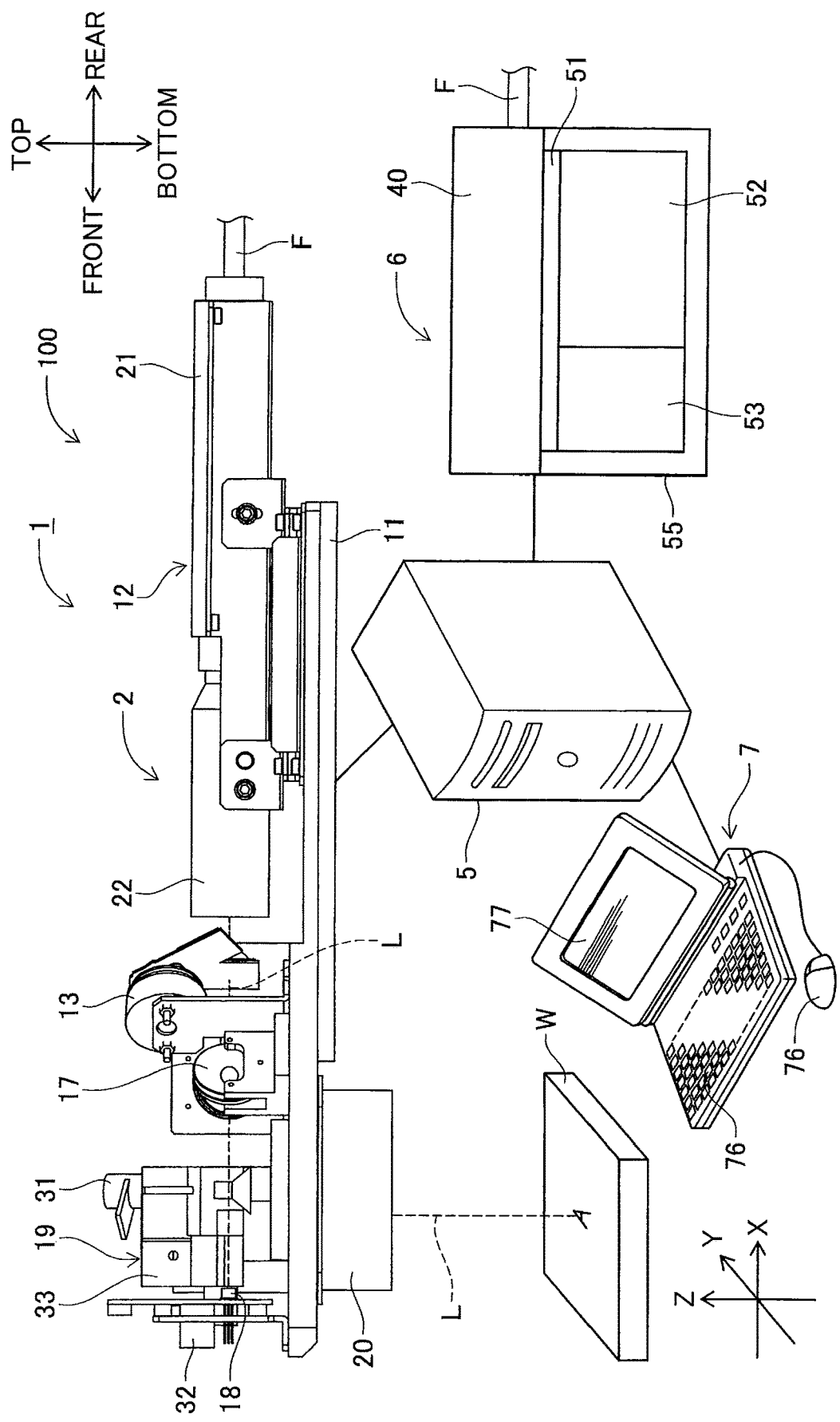
FIG. 1 is a schematic view of a laser machining system according to a first embodiment of the present disclosure.

An embodiment (first embodiment) in which a laser machining apparatus according to the present disclosure is embodied as a laser machining system 100 including a laser machining apparatus 1 will be described while referring to the accompanying drawings wherein like parts and components are designated by the same reference numerals to avoid duplicating description.

Schematic Configuration of Laser Machining System 100

Firstly, the schematic configuration of the laser machining system 100 according to the first embodiment will be explained in detail with reference to FIG. 1. The laser machining system 100 includes the laser machining apparatus 1 and a personal computer (PC) 7. The laser machining system 100 is configured to control the laser machining apparatus 1 according to drawing data generated by the PC 7, thereby performing marking machining in which a pulsed laser L as an example of the laser beam scans a surface of a workpiece (workpiece W, for example) two dimensionally.

Schematic Configuration of Laser Machining Apparatus 1

Next, the schematic configuration of the laser machining apparatus 1 of the laser machining system 100 will be described in detail with reference to the drawings. As illustrated in FIG. 1, the laser machining apparatus 1 according to the first embodiment includes a device main unit 2, a laser controller 5, and a power unit 6.

The device main unit 2 irradiates the pulsed laser L onto the surface of the workpiece W and performs two-dimensional scan of the pulsed laser L on the surface of the workpiece W, thereby executing the marking machining on the surface of the workpiece W. The laser controller 5 is configured of a computer, and is connected to the PC 7 so as to be capable of performing bi-directional communications therebetween. The laser controller 6 is also electrically connected to the device main unit 2 and the power unit 6. The PC 7 is used for generating the drawing data for performing the marking machining on the surface of the workpiece W, for setting control parameters in accordance with machining conditions, for assisting in adjusting a position of the workpiece W, and the like. The laser controller 5 drives and controls the device main unit 2 and the power unit 6 according to the drawing data, the control parameters, and various instructions transmitted from the PC 7. The workpiece W is an example of the workpiece of the present disclosure.

Note that FIG. 1 illustrates only the schematic configuration of the laser machining system 100 and the laser machining apparatus 1, thus the device main unit 2 is also schematically illustrated in FIG. 1. Therefore, the specific configuration of the device main unit 2 will be described later.

Schematic Configuration of Device Main Unit 2

Next, the schematic configuration of the device main unit 2 will be described with reference to FIGS. 1 and 2. In the description about the device main unit 2, the leftward, rightward, upward, and downward in FIG. 1 respectively correspond to frontward, rearward, upward, and downward of the device main unit 2 as indicated in FIG. 1. Thus, the emitting direction of the pulsed laser L from a laser oscillator 21 (described later) is the frontward direction. Also, in the direction perpendicular to both a main base 11 (described later) and the pulsed laser L is the upward/downward directions. Further, the direction perpendicular to both the upward/downward directions and frontward/rearward directions is the leftward/rightward directions of the device main unit 2.

The device main unit 2 includes a laser head unit 3 (see FIG. 2) coaxially emitting the pulsed laser L and a visible laser beam M from an fθ lens 20, and a substantially box-shaped machining chamber (not shown) having an upper surface on which the laser head unit 3 is fixed.

Figure 2:
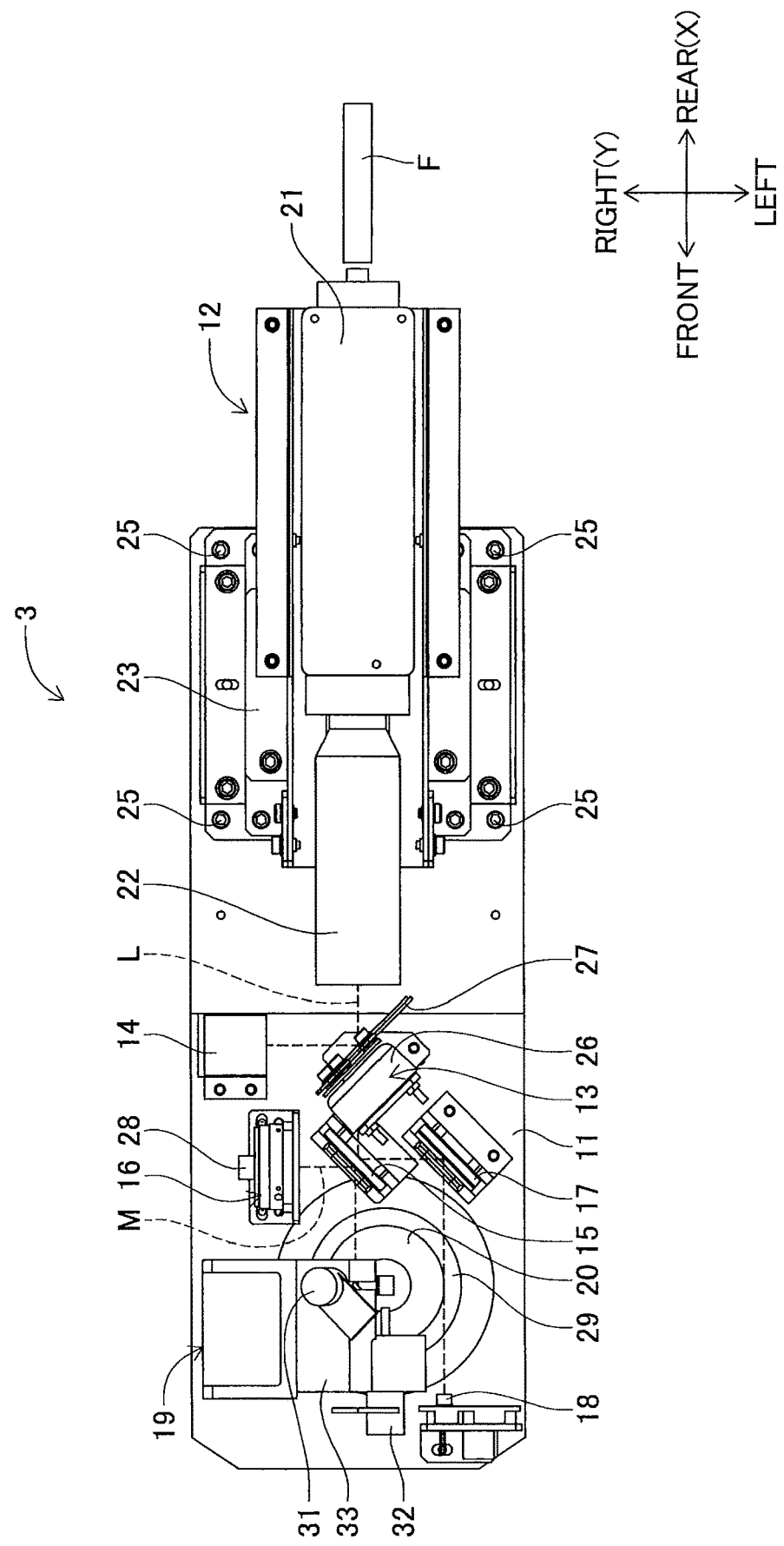
FIG. 2 is a plan view showing a structure of a laser head unit in a laser machining apparatus according the first embodiment.

As illustrated in FIG. 2, the laser head unit 3 includes the main base 11, a laser oscillation unit 12 configured to emit a pulsed laser L, a light shutter 13, a light damper 14, a half mirror 15, a guide optical section 16, a reflection mirror 17, an optical sensor 18, a galvano scanner 19, and the fθ lens 20. The laser head unit 3 is housed in a substantially cuboid-shaped housing (not shown).

The laser oscillation unit 12 includes the laser oscillator 21, a beam expander 22, and a mounting base 23. The laser oscillator 21 has a fiber connector, a condenser lens, a reflection mirror, a laser medium, a passive Q-switch, an output coupler, and a window, which are accommodated in a casing. The power unit 6 has a semiconductor laser pumping unit 40. The fiber connector is in optical communication with an optical fiber F. Pump light emitted from the semiconductor laser pumping unit 40 is incident upon the fiber connector via the optical fiber F.

The condenser lens concentrates the pump light incident from the fiber connector. The reflection mirror allows the pump light concentrated by the condenser lens to pass therethrough and simultaneously reflects a laser beam emitted from the laser medium at high efficiency. The laser medium is pumped by the pump light emitted from the semiconductor laser pumping unit 40 to oscillate the laser beam. For example, neodymium doped gadolinium vanadate (Nd:GdVO4) crystal to which neodymium (Nd) is doped as a laser active ion, neodymium doped yttrium vanadate (Nd:YVO4) crystal, and neodymium doped yttrium aluminum garnet (Nd:YAG) crystal may be used as the laser medium.

The passive Q-switch is crystal having properties that a penetration rate becomes a value from 80% to 90% when optical energy stored therein exceeds a certain value. Thus, the passive Q-switch functions as a Q-switch for oscillating the laser beam oscillated from the laser medium as a pulsed laser L having a pulse shape. For example, chrome doped YAG (Cr:YAG) crystal and Cr:MgSiO4 crystal may be used as the passive Q-switch.

The output coupler constitutes the reflection mirror and a laser resonator. The output coupler is, for example, a partial reflection mirror configured of a concave mirror having a surface coated with a dielectric multi-layer film. The partial reflection mirror has a reflection rate from 80% to 95% in a wavelength of 1063 nm. The window is formed of synthetic silica and the like, and allows the laser beam emitted from the output coupler to pass therethrough outwardly. Thus, the laser oscillator 21 oscillates the pulsed laser through the passive Q-switch, and outputs the pulsed laser L as the laser beam for performing the marking machining on the surface of the workpiece W.

The beam expander 22 changes a beam diameter of the pulsed laser L, and is attached in coaxial relation to the axis of the laser oscillator 21. The laser oscillator 21 is mounted on the mounting base 23 so as to be capable of adjusting an optical axis of the pulsed laser L. The mounting base 23 is fixed by each mounting screw 25 at a position rearward from the center position in the frontward/rearward directions with respect to the upper surface of the main base 11.

The light shutter 13 includes a shutter motor 26, and a shutter 27 having a plate shape. The shutter motor 26 is configured of a stepping motor and the like. The shutter 27 is attached to a motor shaft of the shutter motor 26, and coaxially rotates with the same. When the shutter 27 is rotated at a position where an optical path of the pulsed laser L emitted from the beam expander 22 is interrupted, on one hand, the shutter 27 reflects the pulsed laser L toward the light damper 14 which is located on the right side of the light shutter 13. When the shutter 27 is rotated at a position out of the optical path of the pulsed laser L emitted from the beam expander 22, on the other hand, the pulsed laser L emitted from the beam expander 22 is incident upon the half mirror 15 which is located in front of the light shutter 13.

The light damper 14 absorbs the pulsed laser L reflected by the shutter 27. Heat generation of the light damper 14 is transferred to the main base 11 and thus the light damper 14 is cooled. The half mirror 15 is disposed so that the surface of the half mirror 15 is oriented in diagonally frontward left direction to form forty-five degrees with respect to the optical path of the pulsed laser L. The half mirror 15 allows substantially all the pulsed laser L incident into the rear side of the half mirror 15 to pass therethrough. A part of the pulsed laser L incident into the rear side of the half mirror 15 is reflected at forty-five degrees so as to be directed toward the reflection mirror 17. The reflection mirror 17 is disposed at a left-side position relative to the central portion on the rear surface of the half mirror 15 upon which the pulsed laser L is incident.

The guide optical section 16 includes a visible semiconductor laser 28 and a lens array (not shown). The visible semiconductor laser 28 irradiates the visible laser beam M, such as a red laser beam, and the lens array collimates the visible laser beam M emitted from the visible semiconductor laser 28 into a parallel beam. The visible laser beam M has a wave length different from that of the pulsed laser L irradiated from the laser oscillator 21. The guide optical section 16 is disposed at a right-side position relative to the central portion of the front surface of the half mirror 15 from which the pulsed laser L is emitted. As a result, the visible laser beam M is incident upon the central portion from which the pulsed laser L is emitted of the front for reflection surface of the half mirror 15 with an incident angle of forty-five degrees with respect to the reflection surface of the half mirror 15. Then, the visible laser beam M is reflected upon the reflection surface of the half mirror 15 with a reflection angle of forty-five degrees and advances along the optical path of the pulsed laser L. That is, the visible semiconductor laser 38 irradiates the visible laser beam M along the optical path of the pulsed laser L.

The reflection mirror 17 is disposed in the optical path of the pulsed laser L in an orientation to face diagonally frontward left direction to form forty-five degrees relative to the frontward direction parallel to the optical path. A part of the pulsed laser L reflected upon the rear surface of the half mirror 15 is incident upon the central portion of the reflection surface of the reflection mirror 17 at an incident angle of forty-five degrees. The reflection mirror 17 directs the pulsed laser L incident upon the reflecting surface of the reflection mirror 17 in the frontward direction at a reflection angle of forty-five degrees.

The optical sensor 18 is configured of a photodetector capable of detecting output intensity of the pulsed laser L and the like. As illustrated in FIG. 2, the optical sensor 18 is disposed in front of the reflection mirror 17 so as to receive the pulsed laser L emitted from the central portion of the reflection mirror 17 upon which the pulsed laser L is reflected. With such a positional relationship between the reflection mirror 17 and the optical sensor 18, the output intensity of the pulsed laser L can be detected. In this manner, the output intensity of the pulsed laser L emitted from the laser oscillator 21 can be detected with the optical sensor 18.

An opening 29 is formed in a front portion of the main base 11. The galvano scanner 19 is disposed above the opening 29 of the main base 11 and directs the pulsed laser L emitted from the laser oscillation unit 12 and the visible laser beam M reflected upon the rear surface of the half mirror 15 downward through the opening 29 and performs two-dimensional scan. More specifically, the galvano scanner 19 includes a galvano X-axis motor 31, a galvano Y-axis motor 32, and a main unit 33. The galvano X-axis motor 31 and the galvano Y-axis motor 32 are mounted on the main unit 33. The motor shafts of the galvano X-axis motor 31 and the galvano Y-axis motor 32 are inserted into the respective openings formed in the main unit 33, and are arranged orthogonal to each other. A scan mirror is movably attached to the tip end of each motor shaft. Thus, in the galvano scanner 19, the two scan mirrors diagonally face each other and perform two-dimensional scans while moving in cooperation with each other. Controlling the rotations of the galvano X-axis motor 31 and the galvano Y-axis motor 32 changes the reflecting angles of the respective scan mirrors. As a result, the pulsed laser L and the visible laser beam M are directed downward and perform two-dimensional scans for scanning the pulsed laser L and the visible laser beam M frontward/rearward direction (X direction) and leftward/rightward direction (Y direction).

The fθ lens 20 operates to coaxially collimate the two-dimensionally scanning pulsed laser L and visible laser beam M onto the surface of the workpiece (workpiece W) disposed below the Pθ lens 20. The fθ lens 20 converges the pulsed laser L and the visible laser beam M into a focal point that is a planate focal plane, and adjusts the pulsed laser L and the visible laser beam M so as to regulate the constant scanning speed of the pulsed laser L and the visible laser beam M. In this manner, by controlling the rotations of the galvano X-axis motor 31 and the galvano Y-axis motor 32, the pulsed laser L and the visible laser beam M perform two-dimensional scan in both frontward/rearward direction (X direction) and leftward/rightward direction (Y direction) on the surface of the workpiece W, thereby forming a desired machining pattern on the workpiece W.

Schematic Configuration of Power Unit 6

Next, the schematic configuration of the power unit 6 in the laser machining apparatus 1 will be described with reference to FIG. 1. As illustrated in FIG. 1, the power unit 6 includes the semiconductor laser pumping unit 40, a laser driver 51, a power supply part 52, and a cooling unit 53, which are provided in a casing 55. The power supply part 52 supplies a drive current for driving the semiconductor laser pumping unit 40 to the semiconductor laser pumping unit 40 through the laser driver 51. The laser driver 51 drives the semiconductor laser pumping unit 40 by DC drive according to driving data inputted from the laser controller 5.

The semiconductor laser pumping unit 40 is optically connected to the laser oscillator 21 through the optical fiber F. When a pulse-shaped drive current is inputted from the laser driver 51, the semiconductor laser pumping unit 40 injects, into the optical fiber F, the pump light as a laser beam whose output is proportional to a current value exceeding a current threshold at which a laser beam is generated. Thus, the pump light from the semiconductor laser pumping unit 40 is injected into the laser oscillator 21 via the optical fiber F. For example, a bar-type semiconductor laser using the GaAs may be used as the semiconductor laser pumping unit 40.

The cooling unit 53 is provided for keeping the temperature of the power supply part 52 and the semiconductor laser pumping unit 40 within a prescribed range. The cooling unit 53 controls the temperature of the semiconductor laser pumping unit 40 by, for example, an electron cooling system to finely adjust an oscillation wavelength of the semiconductor laser pumping unit 40. Moreover, a cooling unit using a water-cooled system or an air-cooled system may be used as the cooling unit 53.

Control System of Laser Machining System 100

Figure 3:
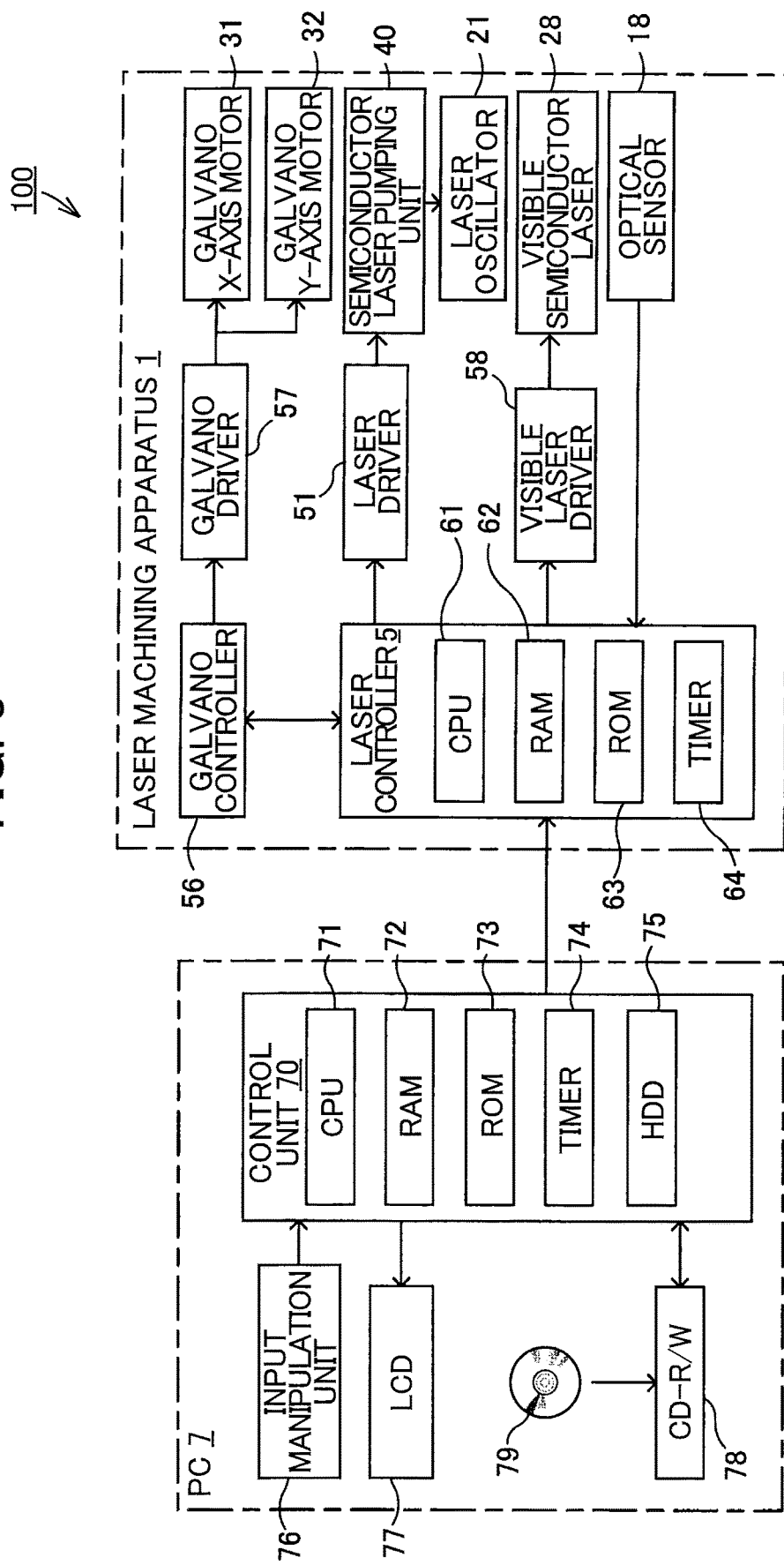
FIG. 3 is a block diagram showing a configuration of a control system in the laser machining system.

Next, the configuration of the control system of the laser machining apparatus 1 constituting the laser machining system 100 will be described with reference to the drawings. As illustrated in FIG. 3, the laser machining apparatus 1 includes the laser controller 5 for governing overall operations of the laser machining apparatus 1, the laser driver 51, a galvano controller 56, a galvano driver 57, a visible laser driver 58, and the like. The laser controller 5 is in electrical communication with the laser driver 51, the galvano controller 56, the optical sensor 18, the visible laser driver 58, and the like.

The laser controller 5 includes a central processing unit (CPU) 61, a random access memory (RAM) 62, a read-only memory (ROM) 63, a timer 64, and the like. The CPU 61 is provided as an arithmetic device and a control device for governing overall operations of the laser machining apparatus 1. The timer 64 is provided for measuring time. The CPU 61, the RAM 62, the ROM 63, and the timer 64 are interconnected via a bus line (not shown), and are in data communication with one another.

The RAM 62 temporarily stores various results of arithmetic operations performed by the CPU 61, X- and Y-coordinate data of a drawing pattern, and the like. The ROM 63 stores various kinds of programs including a program for performing arithmetic operations to obtain X- and Y-coordinate data of a drawing pattern according to drawing data transmitted from the PC 7 to store the X- and Y-coordinate data in the RAM 62. Specifically, drawing data inputted from the PC 7 represents images defined by positional information. A set of consecutive points derived from the positional information are treated as either a single straight line or an elliptic segment curved line, and X- and Y-coordinate data for each of such lines is obtained to define a drawing pattern. The ROM 63 stores data regarding start point, end point, focal point, and curvature of each elliptic segment curved line that constitute a character with one of a plurality of fonts. Such data is stored in the ROM 43 on a font basis.

The CPU 61 executes various arithmetic and control processes according to the control programs stored in the ROM 63. For example, the CPU 61 receives drawing data from the PC 7 and computes X- and Y-coordinate data, galvano scanning speed data, and the like. Then, the CPU 61 outputs the resultant data to the galvano controller 56. Further, the CPU 61 outputs data inputted from the PC 7 to the laser driver 51. The outputted data relates to supply control of a drive current to the semiconductor laser pumping unit 40, output light intensity of pump light outputted from the semiconductor laser pumping unit 40, a time duration of outputting the pump light, and the like. Also, the CPU 61 outputs the X- and Y-coordinate data of the drawing pattern, a control signal for instructing ON/OFF of the galvano scanner 19 and the like to the galvano controller 56.

The laser driver 51 drives and controls the semiconductor laser pumping unit 40 according to control parameters related to the semiconductor laser pumping unit 40 (such as a current value of the drive current, the output light intensity of the pump light, and the time duration of outputting the pump light, for example) inputted from the laser controller 5. Specifically, the laser driver 51 generates a pulse-shaped drive current (a first current, a second current, and a third current described later, for example) in accordance with the control parameters related to a current value of the drive current inputted from the laser controller 5, and outputs the drive current to the semiconductor laser pumping unit 40 for a time duration (first current supply period Ta, a second current supply period Tb, a third current supply period Tc described later, for example) specified in accordance with the control parameters indicating a time duration to supply the drive current. Thus, the semiconductor laser pumping unit 40 supplies the pump light having output light intensity proportional to the current value of the drive current into the optical fiber F for the prescribed time duration.

The galvano controller 56 computes driving angles and rotational speeds of both the galvano X-axis motor 31 and the galvano Y-axis motor 32 according to the X- and Y-coordinate data, the galvano scanning speed data, and the like of the drawing pattern inputted from the laser controller 5. The galvano controller 50 outputs motor drive data representing the computed driving angle and the rotational speed to the galvano driver 57.

The galvano driver 57 drives and controls the galvano X-axis motor 31 and the galvano Y-axis motor 32 according to the motor drive data representing the driving angle and the rotational speed and inputted from the galvano controller 56, thereby performing two-dimensional scan of the pulsed laser L.

The visible laser driver 58 controls the guide optical section 16 including the visible semiconductor laser 28 according to a control signal outputted from the laser controller 5. The visible laser driver 58 controls, for example, a light amount of the visible laser beam M emitted from the visible semiconductor laser 28 according to the control signal.

As illustrated in FIGS. 1 and 3, the laser controller 5 is connected to the PC 7, and the bi-directional communications can be made between the two. The laser controller 5 is configured to be able to receive drawing data indicating machining contents, control parameters of the device main unit 2, various user instructions, and the like from the PC 7.

Control System of PC 7

Next, the configuration of the control system of the PC 7 constituting the laser machining system 100 will be described with reference to the drawings. As illustrated in FIG. 3, the PC 7 is configured of a control unit 70 for governing overall operations of the PC 7, an input manipulation unit 76, a liquid crystal display (LCD) 77, a CD-R/W 78, and the like. The input manipulation unit 70 includes a mouse, a keyboard, and the like. The CD-R/W 78 is provided for reading from and writing into CD-ROMs 79 various types of data, programs, and the like.

The control unit 70 includes a CPU 71, a RAM 72, a ROM 73, a timer 74, a hard disk drive (HDD) 75, and the like. The CPU 71 is provided as an arithmetic device and a control device for governing overall operations of the PC 7 and governing overall operations of the laser machining system 100 through the laser controller 5. The timer 74 is provided for measuring time. The CPU 71, the RAM 72, the FOM 72, and the timer 74 are interconnected via a bus line (not shown), and are in data communication with one another. The CPU 71 and the HDD 75 are interconnected via an input-output interface (not shown), and are in data communication with each other.

The RAM 72 temporarily stores various results of arithmetic operation performed by the CPU 71 and the like. The ROM 73 stores various kinds of control programs and data tables.

The HDD 75 is a storage for storing programs of various kinds of application software and various kinds of data files. In the first embodiment, the HDD 75 stores a laser machining program (see FIG. 4) and a supply current control database (see FIG. 7). The laser machining program is a program for performing the machining on the surface of the workpiece W with the pulsed laser L. The supply current control database is configured to associate machining conditions related to laser machining operation using the pulsed laser L with various control parameters respectively.

The CD-R/W 78 reads from and writes into the CD-ROM 79 data groups such as application programs, various kinds of data tables, and the like. That is, the PC 7 reads the laser machining program and its subroutine (see FIGS. 4 and 5) and the supply current control database (see FIG. 7) from the CD-ROM 79 through the CD-R/W 78, and stores them in the HDD 75.

The laser machining program and its subroutine (see FIGS. 4 and 5) and the supply current control database (see FIG. 7) may be stored in the ROM 73, read from a storage medium such as the CD-ROM 79, or downloaded through network such as an Internet and the like (not shown).

The control unit 70 is electrically connected to the input manipulation unit 76 including a mouse, a keyboard, and the like, the LCD 77, and the like via an input-output interface (not shown). Thus, the PC 7 is used for setting machining conditions related to the laser machining operation such as the scanning speed of the galvano scanner 19, the material of the workpiece W, and the like, and inputting a process-start command of the laser machining operation by utilizing the input manipulation unit 76 and the LCD 77.

Detailed Description of Laser Machining Program

Next, steps in a process implemented by the laser machining program executed on the PC 7 will be described in detail with reference to FIGS. 4 through 11. The laser machining program is an application program executed by the CPU 71 when laser machining is performed on a surface of a workpiece W.

Figure 4:
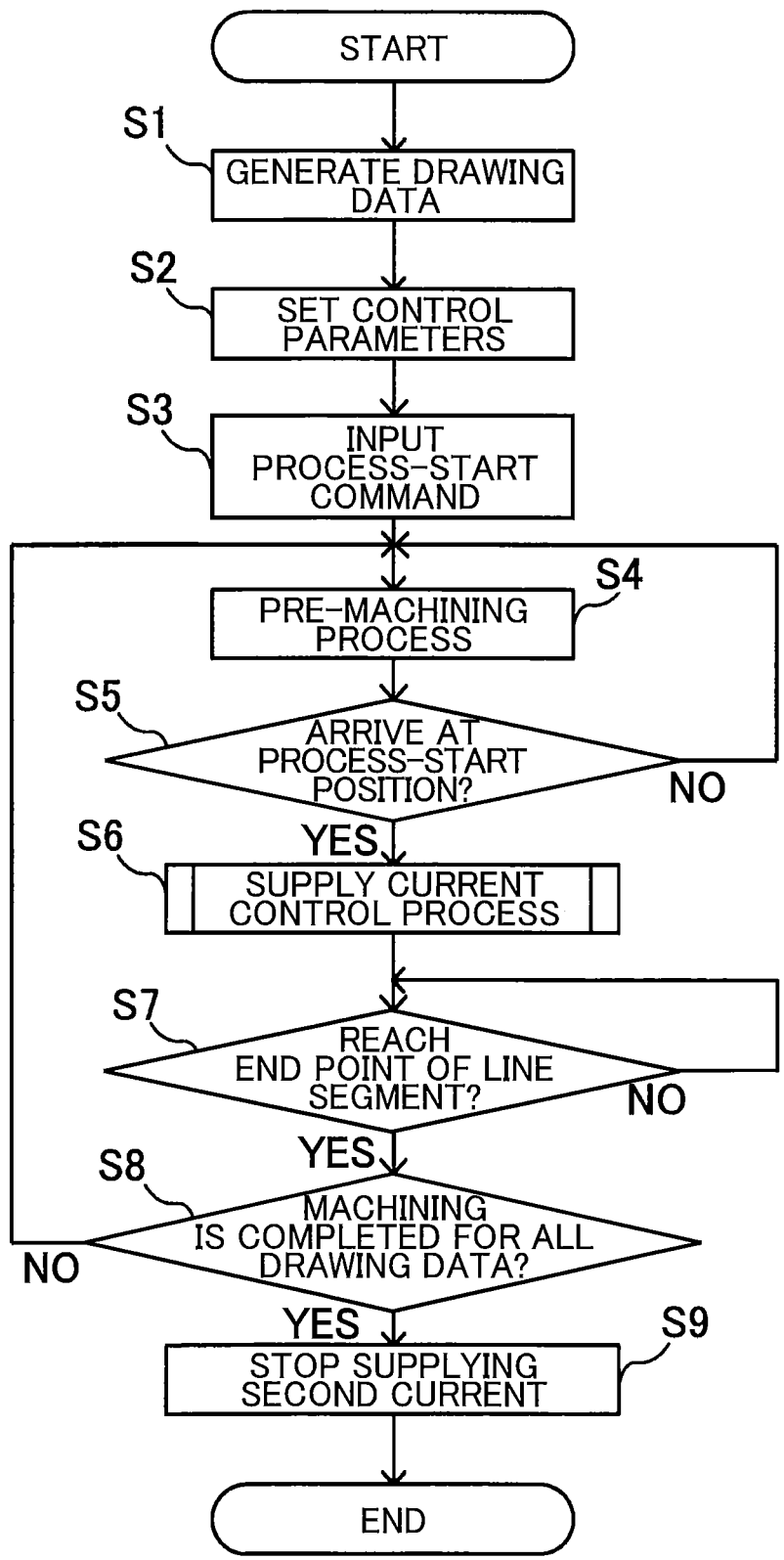
FIG. 4 is a flowchart illustrating steps in a laser machining process implemented by a laser machining program executed on a personal computer (PC) in the laser machining system according to the first embodiment.

As illustrated in FIG. 4, upon starting execution of the laser machining program in S1, the CPU 71 first generates drawing data specifying details of the laser machining operation according to manipulated signals from the input manipulation unit 76 and the like. The drawing data is configured of one or more straight and/or curved lines that, as a set, represent the desired drawing content. After generating drawing data, the CPU 71 stores this data in the RAM 72 and advances to S2.

In S2 the CPU 71 uses a machining condition input window 80 displayed on the LCD 77 to receive inputted machining conditions for the current laser machining operation, and sets control parameters for these machining conditions on the basis of the machining conditions themselves and the content of a supply current control database constructed and stored on the HDD 75. After storing the control parameters in the RAM 72, the CPU 71 advances to S3.

Configuration of Machining Condition Input Window 80

Figure 6:
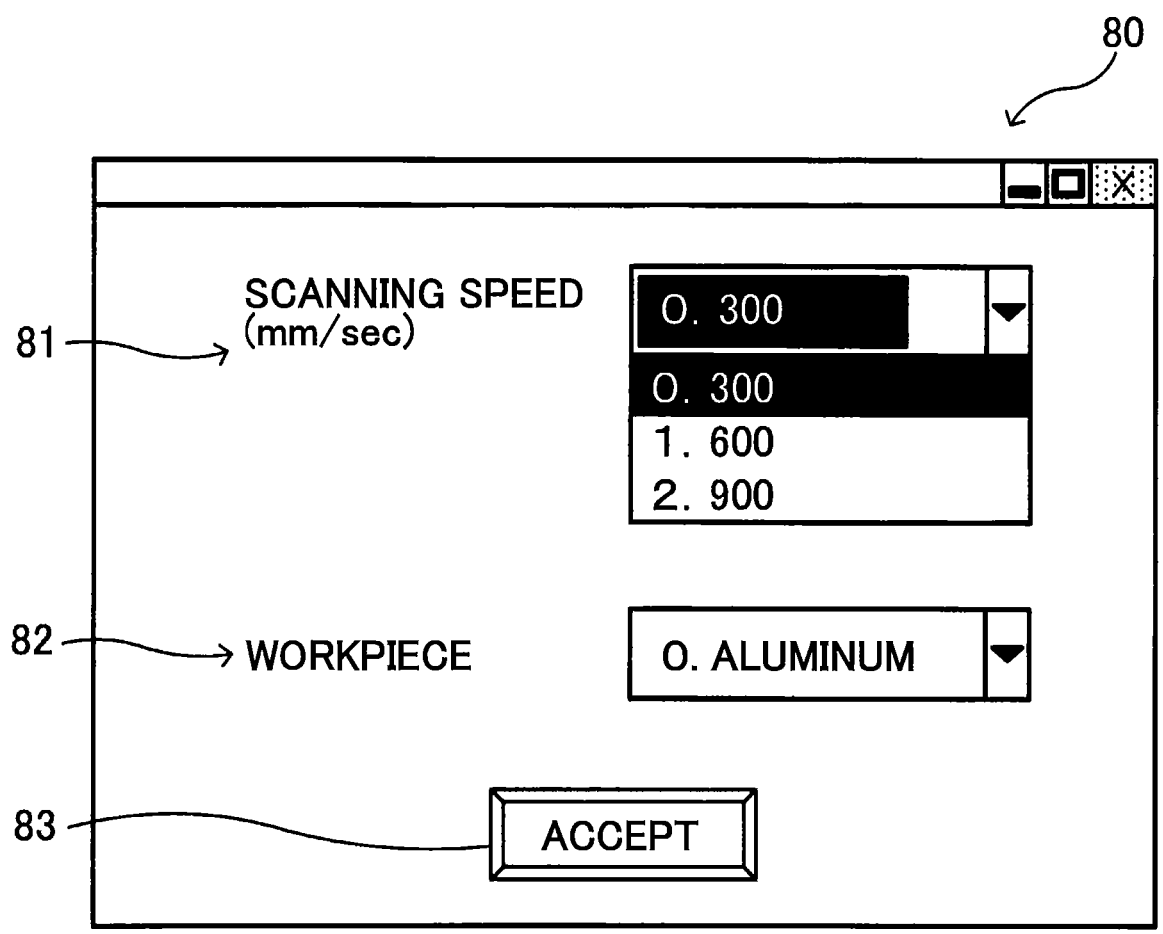
FIG. 6 is an explanatory diagram illustrating an example of a machining condition input window.

The machining condition input window 80 is displayed on the LCD 77 in order to set control parameters for the current laser machining operation. Upon receipt of user's manipulation on the input manipulation unit 76, the machining conditions for the current laser machining operation are set via the machining condition input window 80. As illustrated in FIG. 6, the machining condition input window 80 has a scanning speed setting field 81, a workpiece material setting field 82, and an ACCEPT button 83.

The scanning speed setting field 81 accepts a user's selection for the scanning speed of the pulsed laser L scanned by the galvano scanner 19 as one machining condition for the current laser machining operation. The scanning speed setting field 81 allows the user to select a desired scanning speed from a plurality of different scanning speeds through manipulation on the input manipulation unit 76. The scanning speed of the pulsed laser L affects the machining quality of the workpiece W since different scanning speeds produce different heat input per unit area on the workpiece W. Therefore, the CPU 71 can identify the scanning speed of the pulsed laser L for performing laser machining on a workpiece W in accordance with the input manipulation in the scanning speed setting field 81 and can set this scanning speed as one of the machining conditions.

The workpiece material setting field 82 accepts input from the user that indicates the material (constituent material) of the workpiece W as one machining condition for the current laser machining operation. The workpiece material setting field 82 allows the user to select a material for the workpiece W to be used in the current laser machining operation from a plurality of different materials, such as aluminum, steel, and the like through manipulation on the input manipulation unit 76. The type of material affects the machining quality of the workpiece W with the pulsed laser L since different types of materials have different physical properties (e.g., light absorption rate, heat conductivity, and the like). Therefore, the CPU 71 can identify the material of the workpiece W used in the current laser machining operation on the basis of input manipulation in the workpiece material setting field 82 and can set this material as one of the machining conditions.

The user manipulates the ACCEPT button 83 when input in the various fields in the machining condition input window 80 is complete. When the user performs manipulation to select the ACCEPT button 83, the CPU 71 sets the conditions received in the fields of the machining condition input window 80 as machining conditions for the current laser machining operation.

Content of Supply Current Control Database

Next, the content of the supply current control database will be described with reference to FIG. 7. The CPU 71 references this database when setting control parameters corresponding to the machining conditions set by using the machining condition input window 80.

As illustrated in FIG. 7, the supply current control database associates one control parameter table with each possible "material of the workpiece W" (e.g., aluminum, steel, and the like), which is one of the machining conditions. Each control parameter table correlates various control parameters, such as the magnitudes of a first current value, a second current value and a third current value, and time durations of a third current supply period Tc and a standby period Ts with each possible "scanning speed of the pulsed laser L," which is another machining condition. In the example of FIG. 7, as described below, the control parameters respectively specify the scanning speed in mm/sec, the first current value, the second current value, and the third current value in an arbitrary unit having a magnitude proportional to ampere, the third current supply period in msec, and the standby period in msec.

Here, the first current value specifies the magnitude of the first current. The first current denotes the drive current supplied to the semiconductor laser pumping unit 40 in order to maintain the laser medium of the laser oscillator 21 in a pumped state. The time duration for supplying this first current to the semiconductor laser pumping unit 40 will be called the "first current supply period Ta."

Similarly, the second current value denotes the magnitude of the second current. The second current signifies the drive current supplied to the semiconductor laser pumping unit 40 for outputting, from the laser oscillator 21, a pulsed laser L having intensity capable of performing laser machining on the workpiece W. Normally, the second current is supplied to the semiconductor laser pumping unit 40 during a laser machining process. The time duration for supplying the second current to the semiconductor laser pumping unit 40 will be called the "second current supply period Tb."

The third current value specifies the magnitude of the third current. The third current denotes the drive current supplied to the semiconductor laser pumping unit 40 during the initial stage of laser machining on the workpiece W and is a value larger than the second current. That is, the third current corresponds to the initial drive current in the present disclosure. The time duration for supplying the third current to the semiconductor laser pumping unit 40 will be called the "third current supply period Tc" and corresponds to the initial drive current supply period in the present disclosure.

The standby period Ts denotes the time elapsed from the starting point of the third current supply period Tc (when the third current is first supplied to the semiconductor laser pumping unit 40) to the point that the galvano scanner 19 starts scanning. The standby period Ts corresponds to the standby period in the present disclosure. Thus, the CPU 71 is configured to initiate scanning with the galvano scanner 19 in the third current supply period Tc at the timing that the standby period Ts has elapsed. Hence, the third current supply period Tc is configured of the standby period Ts and an operating period Tm in which the galvano scanner 19 is scanning. Thus, the operating period Tm can be identified in this supply current control database by identifying the third current supply period Tc and the standby period Ts.

Therefore, once the material of the workpiece W and the scanning speed of the pulsed laser L have been set in the machining condition input window 80 as machining conditions, the CPU 71 can identify and set control parameters (e.g., the third current supply period Tc and the like) corresponding to these machining conditions by referencing the supply current control database. As an example, when the material of the workpiece W has been set to aluminum and the scanning speed of the pulsed laser L to 600 mm/sec, the CPU 71 sets the magnitudes of the first current value, the second current value, and the third current value to 15,000, 32,500, and 42,000, sets the duration of the third current supply period Tc to 2.7 msec and sets the time duration of the standby period Ts to 0.2 msec.

Next, steps from S3 in FIG. 4 will be described. In S3 the CPU 71 inputs a process-start command into the laser controller 5 in response to prescribed manipulation on the input manipulation unit 76. The process-start command includes a control signal instructing the laser controller 5 to start executing the laser machining process. After the process-start command has been inputted into the laser controller 5, the CPU 71 advances to S4.

In S4 the CPU 71 executes a pre-machining process as a preparatory step for the laser machining process based on the drawing data generated in S1. Specifically, in the pre-machining process of S4 the CPU 71 acquires, from the drawing data generated in S1, X- and Y-coordinate data for a process-start position in the laser machining process and inputs the X- and Y-coordinate data into the galvano controller 56 via the laser controller 5. This action causes the galvano scanner 19 to start moving the irradiating position of the pulsed laser L to the process-start position. Further, the CPU 71 controls the laser driver 51 through the laser controller 5 to begin supplying the first current to the semiconductor laser pumping unit 40. When the laser driver 51 inputs the first current into the semiconductor laser pumping unit 40, the semiconductor laser pumping unit 40 emits pump light corresponding to the magnitude of the first current into the optical fiber F. When the pump light is incident upon the laser oscillator 21 via the optical fiber F, the pump light causes the laser medium in the laser oscillator 21 to transit from the ground state to a pumped state. Subsequently, the CPU 71 advances to S5.

In S5 the CPU 71 determines whether the irradiating position of the pulsed laser L, whose movement was initiated in S4, has reached the process-start position according to the X- and Y- coordinate data specifying the process-start position and control details for the galvano scanner 19. The CPU 71 continues to supply the first current to the semiconductor laser pumping unit 40 until the irradiating position has reached the process-start position. When the irradiating position of the pulsed laser L arrives at the process-start position (S5: YES), the CPU 71 advances to S6.

Detailed Description of Supply Current Control Program According to First Embodiment In S6 of FIG. 4, the CPU 71 executes a supply current control process to control the drive current supplied to the semiconductor laser pumping unit 40, thereby suppressing a decline in machining quality in a manner suited to the machining conditions. In the supply current control process of S6 (see FIG. 5), the CPU 71 reads and executes a supply current control program.

Figure 5:
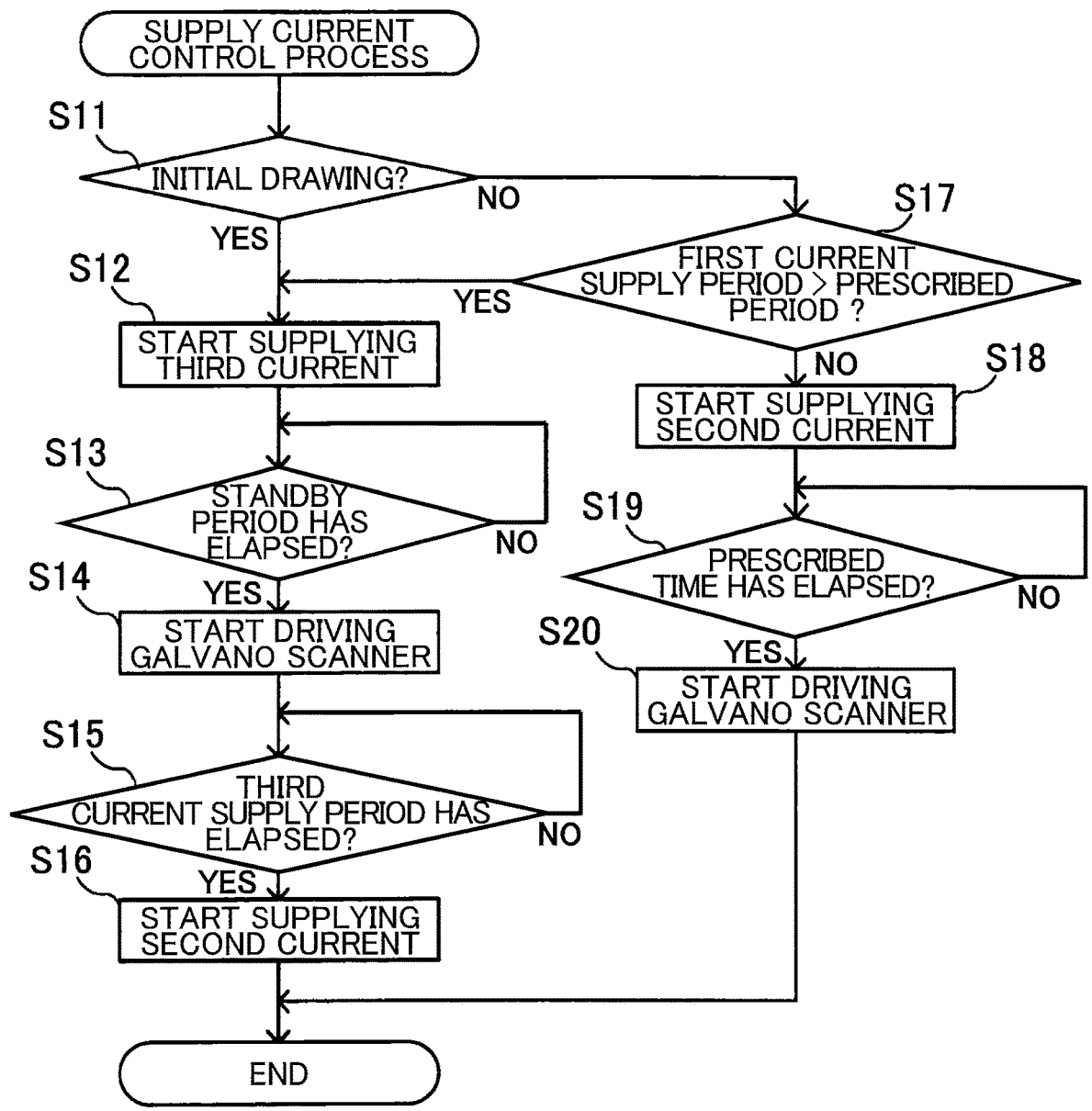
FIG. 5 is a flowchart illustrating steps in a supply current control process implemented by a supply current control program executed on the PC in the laser machining system according to the first embodiment.

When advancing to the supply current control process of S6 and initiating execution of the supply current control program, in S11 of FIG. 5 the CPU 71 first determines whether machining operation at the current point in time constitutes an initial drawing in the current laser machining operation on the basis of the content of the drawing data. When the machining operation constitutes an initial drawing (S11: YES), the CPU 71 advances to S12. When the machining operation constitutes a second or subsequent drawing in the current laser machining operation (S11: NO), the CPU 71 advances to S17.

In S12 the CPU 71 starts supplying the third current to the semiconductor laser pumping unit 40 while simultaneously beginning the third current supply period Tc. Since the third current is larger in magnitude than the second current, the third current can increase the output level of the pump light, causing the semiconductor laser pumping unit 40 to more rapidly output a pulsed laser L having intensity capable of machining the workpiece W. After initiating supply of the third current in the third current supply period Tc, the CPU 71 advances to S13.

In S13 the CPU 71 determines whether the standby period Ts has elapsed since the start of the third current supply period Tc. The standby period Ts is specified by a numerical value for "standby period," which is one of the control parameters set in S2 on the basis of the machining conditions and the supply current control database (see FIG. 7). If the standby period Ts has elapsed (S13: YES), the CPU 71 advances to S14. However, if the standby period Ts has not elapsed (S31: NO), the CPU 71 delays processing while maintaining the irradiating position of the pulsed laser L without performing a scan with the galvano scanner 19.

As the standby period Ts elapses and the CPU 71 advances to S14, the CPU 71 starts controlling the galvano scanner 19 to scan the pulsed laser L. This period is within the third current supply period Tc in which the third current is being supplied to the semiconductor laser pumping unit 40 and, hence, corresponds to the operating period Tm described above. Accordingly, since the galvano scanner 19 is scanning the irradiating position of the pulsed laser L while a pulsed laser L having intensity capable of machining the workpiece W is emitted from the laser oscillator 21, machining operation of the workpiece W with the pulsed laser L is started. After initiating scanning with the galvano scanner 19, the CPU 71 advances to S15.

In S15 the CPU 71 determines whether the third current supply period Tc has elapsed. The time duration of the third current supply period Tc in this case is specified by a numerical value for "third current supply period Tc," which is one of the control parameters set in S2 on the basis of the machining conditions and the supply current control database (see FIG. 7). If the third current supply period Tc has elapsed (S15: YES), the CPU 71 advances to S16. However, if the third current supply period Tc has not elapsed (S15: NO), the CPU 71 continues to wait until the third current supply period Tc has elapsed. Since this portion of the third current supply period Tc corresponds to the operating period Tm, the machining operation of the workpiece W with the pulsed laser L is continued until the third current supply period Tc has elapsed.

After the third current supply period Tc has elapsed, in S16 the CPU 71 changes the drive current supplied to the semiconductor laser pumping unit 40 from the third current to the second current, thereby beginning the second current supply period Tb. Since the galvano scanner 19 continues to scan the irradiating position of the pulsed laser L at this time, the machining operation of the workpiece W with the pulsed laser L is continued. After starting to supply the second current to the semiconductor laser pumping unit 40, the CPU 71 quits the supply current control program and advances to S7 in the laser machining process of FIG. 4.

On the other hand, when the machining operation at the current point in time constitutes the second or subsequent drawing in the current laser machining operation (S11: NO), in S17 the CPU 71 determines whether the first current supply period Ta at the current point in time is longer than a prescribed period. That is, in S17 the CPU 71 determines whether the time duration which corresponds to the first current supply period Ta and in which the laser medium of the laser oscillator 21 is in a pumped state is longer than the prescribed period. If the first current supply period Ta is longer than the prescribed period (S17: YES), the CPU 71 determines that there is a high probability that the laser medium has transited from the pumped state to the ground state and therefore advances to S12 to start supplying the third current to the semiconductor laser pumping unit 40. However, if the first current supply period Ta is shorter than the prescribed period (S17: NO), the CPU 71 determines that there is a high probability that the laser medium of the laser oscillator 21 has maintained in the pumped state and advances to S18.

In S18 the CPU 71 changes the drive current supplied to the semiconductor laser pumping unit 40 from the first current to the second current, thereby starting the second current supply period Tb. Since the laser medium of the laser oscillator 21 is in the pumped state in this case, the laser machining apparatus 1 can output a pulsed laser L having intensity capable of machining the workpiece W at a very quick timing after starting to supply the second current. After starting to supply the second current to the semiconductor laser pumping unit 40, the CPU 71 advances to S19.

In S19 the CPU 71 determines whether a prescribed time has elapsed after starting to supply the second current to the semiconductor laser pumping unit 40. If the prescribed time has elapsed after starting to supply the second current to the semiconductor laser pumping unit 40 (S19: YES), the CPU 71 advances to S20. However, if the prescribed time has not elapsed (S19: NO), the CPU 71 continues to wait until the prescribed time has elapsed.

In S20 the CPU 71 starts controlling the galvano scanner 19 to scan the pulsed laser L. At this time, the second current is being supplied to the semiconductor laser pumping unit 40 and a pulsed laser L having intensity capable of machining the workpiece W is being emitted from the laser oscillator 21. Therefore, in S20 the machining operation of the workpiece W with the pulsed laser L is started by starting to scan the irradiating position of the pulsed laser L with the galvano scanner 19. After initiating scanning with the galvano scanner 19, the CPU 71 quits the supply current control program and advances to S7 in the laser machining process of FIG. 4.

Next, the remaining process in FIG. 4 following completion of the supply current control process of S6 will be described. After completing the supply current control process of S6, in S7 the CPU 71 determines whether the irradiating position of the pulsed laser L on the lines constituting the drawing data for the current laser machining process has reached the end point of the line segment for the current drawing target. When the irradiating position of the pulsed laser L has reached the end point of the line segment (S7: YES), the CPU 71 advances to S8. However, if the irradiating position of the pulsed laser L has not yet reached the end point (S7: NO), the CPU 71 continues to wait until the irradiating position of the pulsed laser L has reached the end point. In the latter case, the CPU 71 continues to scan the irradiating position of the pulsed laser L while continuing to supply the second current to the semiconductor laser pumping unit 40. Therefore, the CPU 71 continues machining the line segment for the current drawing target.

In S8 the CPU 71 determines whether the machining operation of the workpiece W with the pulsed laser L has been completed for all drawing content in the drawing data. In other words, the CPU 71 determines whether machining of all line segments constituting the drawing data with the pulsed laser L has been completed. When the machining operation based on all of the drawing data with the pulsed laser L has been finished (S8: YES), the CPU 71 advances to S9. However, if the machining operation has not been completed for all drawing data (S8: NO), the CPU 71 stops supplying the second current to the semiconductor laser pumping unit 40, returns to S4, and executes the machining process from S4 to S7 for a line segment that has not yet been drawn on the workpiece W.

In S9 the CPU 71 stops supplying the second current to the semiconductor laser pumping unit 40 since the machining operation with the pulsed laser L has been completed for all line segments constituting the drawing data, and ends the laser machining process for the workpiece W. Subsequently, the CPU 71 quits the laser machining program.

Relationship between the Time Duration of the Third Current Supply Period Tc and Machining Quality for the Initial Drawing Next, the relationship between the time duration of the third current supply period Tc and machining quality for the initial drawing will be described with reference to FIGS. 8 and 9. This example will use a structure similar to the laser machining system 100 according to the first embodiment that employs a third current supply period Tc during which the third current is supplied to the semiconductor laser pumping unit 40.

Figure 8:
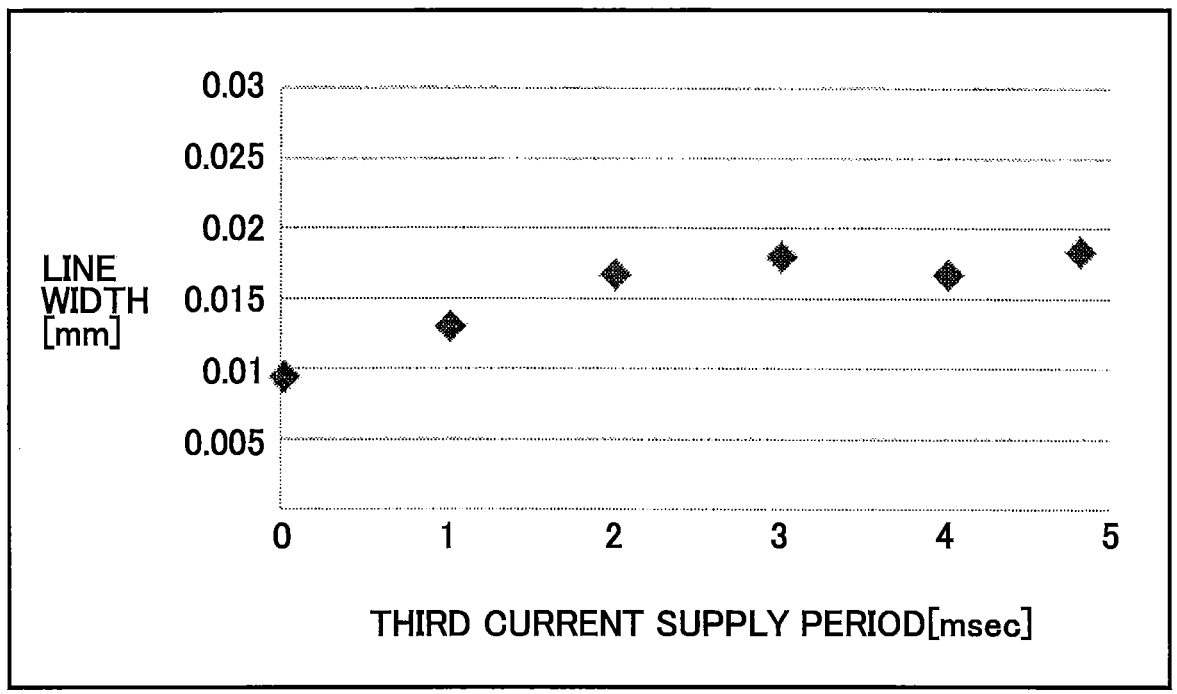
FIG. 8 is an explanatory diagram illustrating a relationship between a line width and a duration of a third current supply period in the laser machining process.
Figure 9:
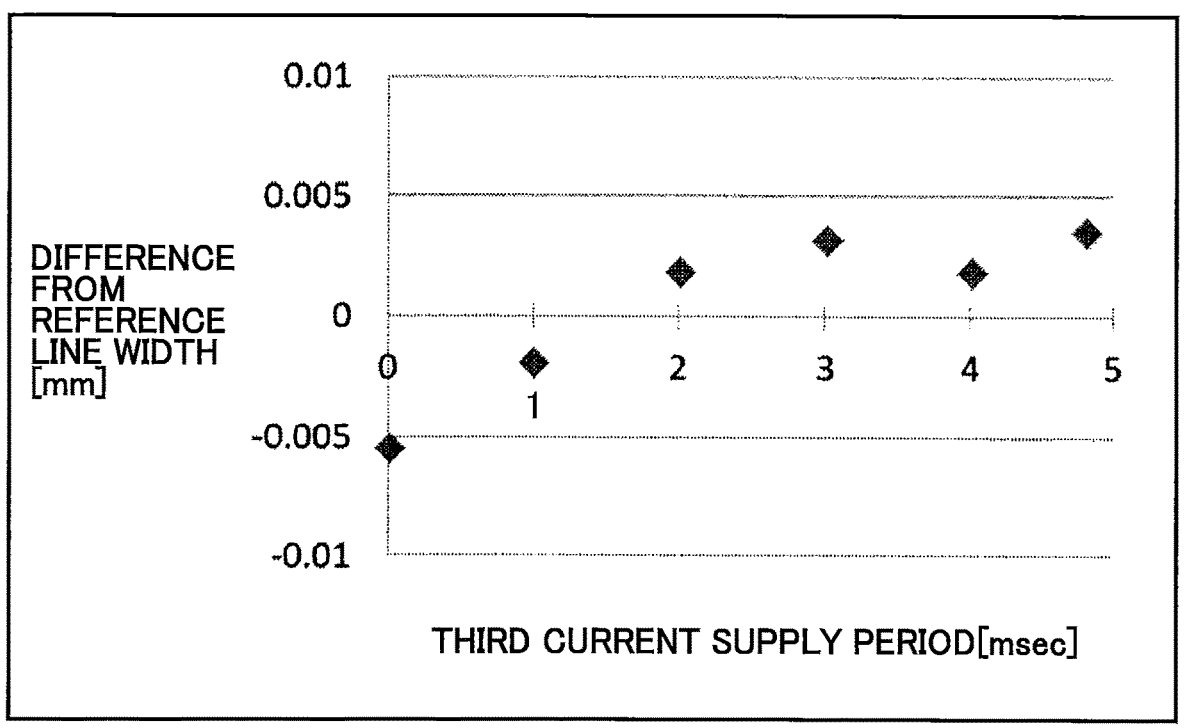
FIG. 9 is an explanatory diagram illustrating a relationship between a difference in the line width of a laser irradiation start portion of an initial drawing from a reference line width and the duration of the third current supply period.

Note that in the example of FIGS. 8 and 9, the galvano scanner 19 is not configured to scan the pulsed laser L at the stage in the third current supply period Tc after the standby period Ts has elapsed, as described in the first embodiment, but is configured to scan the pulsed laser L after the third current supply period Tc has elapsed.

As illustrated in FIG. 8, the line width in the laser irradiation start portion of the initial drawing when machining a workpiece W with the pulsed laser L increases as the third current supply period Tc is extended, but becomes substantially uniform after the third current supply period Tc exceeds a certain time duration. In other words, it is clear that when the third current supply period is too short, machining with the pulsed laser L is inadequate, thereby making it difficult to ensure sufficient machining quality.

FIG. 9 shows the difference in the line width of the laser irradiation start portion of the initial drawing from a reference line width desired by the user. As illustrated in FIG. 9, the line width changes from being narrower than the reference line width to being wider than the reference line width as the third current supply period Tc is extended, and subsequently fluctuates in a state wider than the reference line width as the third current supply period Tc is further extended. Thus, the third current supply period Tc must be set to a suitable time duration in order to draw the laser irradiation start portion of the initial drawing with the reference line width desired by the user.

In the laser machining system 100 according to the first embodiment, in that regard, the user sets machining conditions in the machining condition input window 80, and the CPU 71 sets the time duration of the third current supply period Tc and the time duration of the standby period Ts on the basis of these machining conditions and the supply current control database (see FIG. 7). Thus, since the third current supply period Tc and the standby period Ts can be set to suitable values for the scanning speed of the pulsed laser L, the material of the workpiece W, and the like, the laser machining system 100 can suppress a decline in machining quality in the laser irradiation start portion of the initial drawing.

As can be seen from FIG. 7, the supply current control database is configured such that the standby period Ts remains uniform (0.2 msec in this example), even when the time duration of the third current supply period Tc is different. Therefore, the laser machining system 100 according to the first embodiment can ensure a sufficiently long standby period Ts for increasing the output intensity of the pulsed laser L in order to draw with the desired line width, thereby suppressing a decline in machining quality of the laser irradiation start portion in the laser machining process.

Operations in a Laser Machining Process According to the First Embodiment

Figure 10:
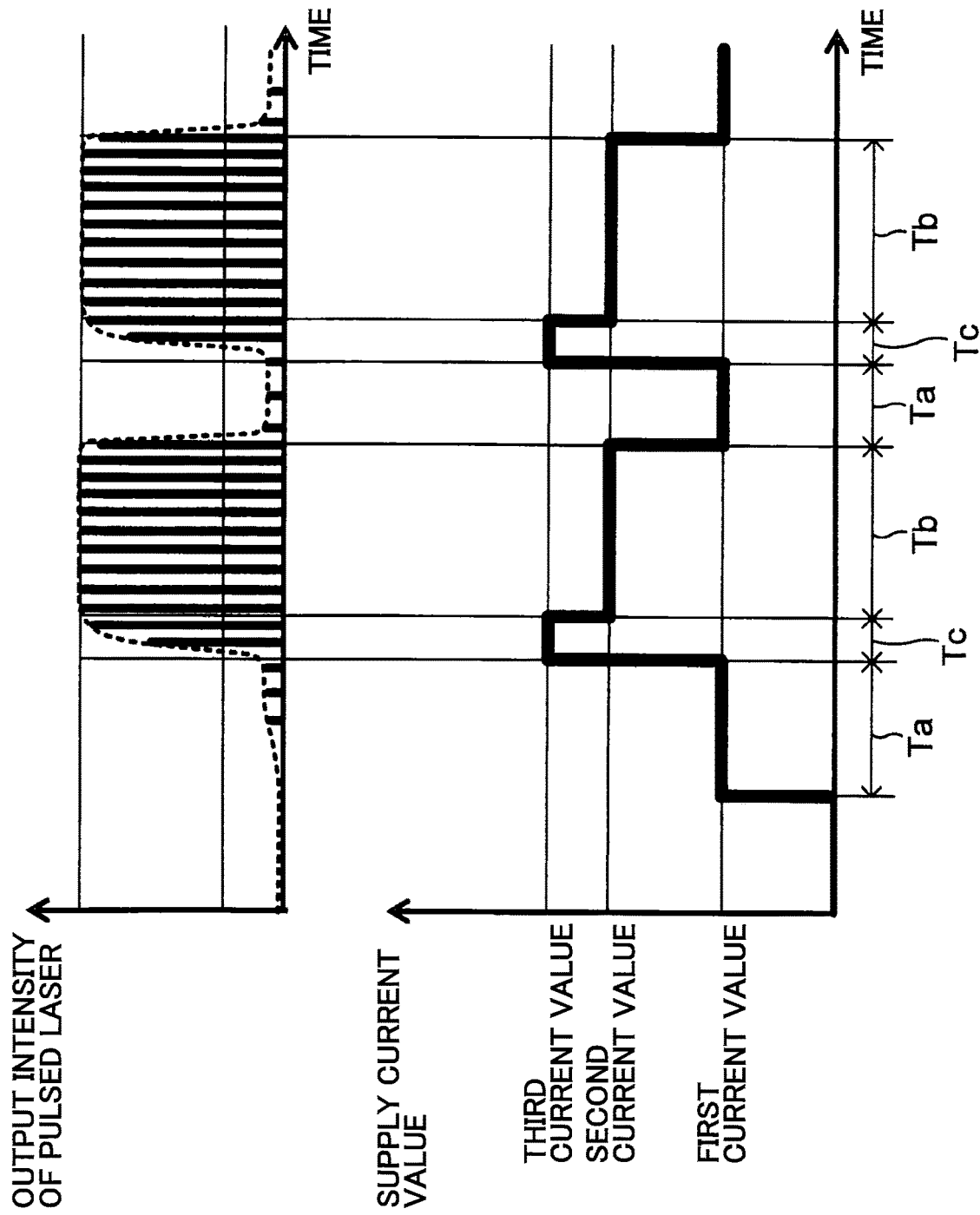
FIG. 10 is an explanatory diagram illustrating a relationship between control details of a drive current and output intensity of a pulsed laser in the first embodiment.
Figure 11:
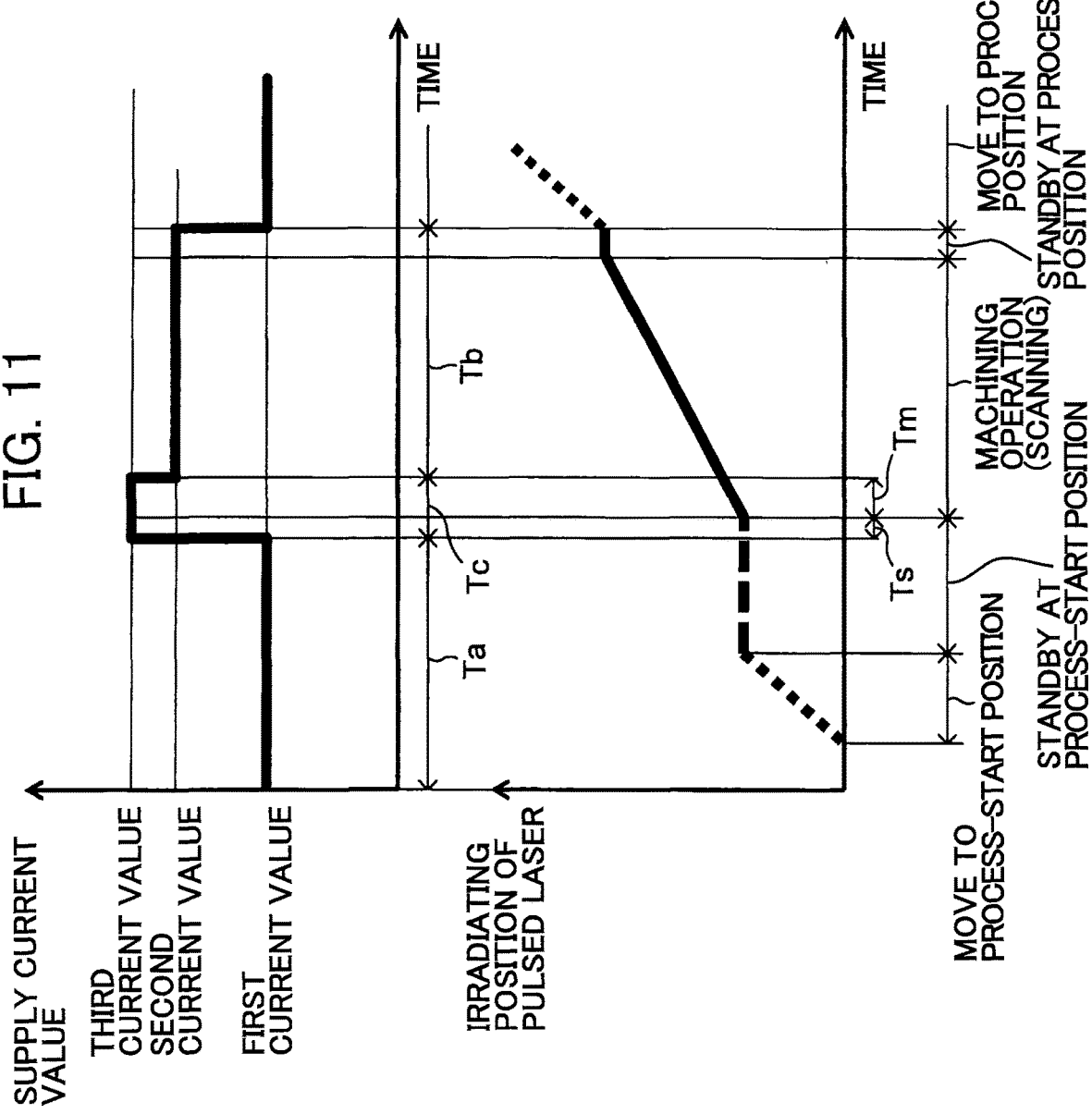
FIG. 11 is an explanatory diagram illustrating a relationship between control details of the drive current and control details of scanning the pulsed laser in the first embodiment.

Next, operations performed on the laser machining system 100 according to the first embodiment during a laser machining process will be described with reference to FIGS. 10 and 11. The following description assumes that steps from S1 to S3 in the laser machining process described above have been completed and that control parameters have been set in accordance with the machining conditions (e.g., the time duration of the third current supply period Tc). Note that in the lower part of FIG. 11, the heavy line indicates that machining operation with the pulsed laser L (i.e., scanning operation of the pulsed laser L) is performed, and the dashed line indicates that the machining operation with the pulsed laser L (scanning operation of the pulsed laser L) is not performed.

As described above for the pre-machining step of S4, the CPU 71 supplies the first current to the semiconductor laser pumping unit 40, and the semiconductor laser pumping unit 40 inputs pump light corresponding to the first current into the laser medium of the laser oscillator 21. Consequently, the laser medium transits from the ground state to a pumped state and the output intensity of the pulsed laser L emitted from the laser oscillator 21 increases gradually (see FIG. 10).

At this time in the pre-machining step of S4, the galvano scanner 19 starts scanning the pulsed laser L by moving the irradiating position of the pulsed laser L toward the process-start position in the drawing data. When the irradiating position of the pulsed laser L arrives at the process-start position (S5: YES), the galvano scanner 19 stops scanning the pulsed laser L and waits at the process-start position (see FIG. 11).

In the supply current control process of S6, the CPU 71 first supplies the third current to the semiconductor laser pumping unit 40 at the start of the third current supply period Tc. The semiconductor laser pumping unit 40 inputs pump light corresponding to the third current into the laser medium of the laser oscillator 21. As described above, the third current has a larger value than the second current. Accordingly, the output intensity of the pulsed laser L emitted from the laser oscillator 21 is increased to a level capable of machining the workpiece W more quickly compared with the case that the second current is supplied to the semiconductor laser pumping unit 40 (see FIG. 10).

At this time in the supply current control process of S6, in S13 of FIG. 5 the galvano scanner 19 waits at the process-start position without scanning the pulsed laser L until the standby period Ts in the third current supply period Tc has elapsed. When the standby period Ts elapses and the operating period Tm begins in the third current supply period Tc, the galvano scanner 19 starts scanning the pulsed laser L according to the content of the drawing data. Hence, since the galvano scanner 19 starts scanning once the output intensity of the pulsed laser L is sufficiently increased to a certain extent, the laser machining system 100 according to the first embodiment can suppress a decline in machining quality of the laser irradiation start portion in the laser machining process.

When the third current supply period Tc has elapsed, in S16 the CPU 71 supplies the second current to the semiconductor laser pumping unit 40 to begin the second current supply period Tb. Since the semiconductor laser pumping unit 40 inputs pump light corresponding to this second current into the laser medium of the laser oscillator 21 at this time, the laser oscillator 21 outputs a pulsed laser L having intensity capable of machining the workpiece W with stability (see FIG. 10).

In the second current supply period Tb, the galvano scanner 19 continues scanning the pulsed laser L according to the content of the drawing data from the point at which scanning in the operating period Tm has been ended.

Once the irradiating position of the pulsed laser L arrives at the process-end position, the CPU 71 stops supplying the second current to the semiconductor laser pumping unit 40, and the second current supply period Tb ends. Once the second current supply period Tb ends, the first current supply period Ta begins again. During the first current supply period Ta, the CPU 71 again supplies the first current to the semiconductor laser pumping unit 40. In this way, the CPU 71 can maintain the laser medium in a pumped state since the semiconductor laser pumping unit 40 is inputting pump light corresponding to the first current into the laser medium of the laser oscillator 21.

In the meantime, the galvano scanner 19 temporarily halts scanning when the irradiating position reaches the process-end position, and subsequently resumes scanning the pulsed laser L by moving the irradiating position of the pulsed laser L toward the next process-start position in the drawing content (for another line segment constituting the drawing data).

As described above, the laser machining system 100 according to the first embodiment employs a third current supply period Tc for performing an initial drawing when machining a workpiece W with the pulsed laser L. Since the CPU 71 supplies the third current to the semiconductor laser pumping unit 40 in this third current supply period Tc, the laser machining system 100 can increase the output intensity of the pulsed laser L more quickly. In addition, the galvano scanner 19 starts scanning the pulsed laser L to perform the initial drawing once the standby period Ts has elapsed in the third current supply period, thereby suppressing a decline in the machining quality of the pulsed laser L.

In the laser machining system 100 according to the first embodiment described above, the laser machining apparatus 1 includes the laser oscillation unit 12 and the galvano scanner 19, and is connected to the laser controller 5, the power supply unit 6, and the PC 7. This laser machining apparatus 1 can machine the surface of the workpiece W using the galvano scanner 19 to scan the pulsed laser L irradiated from the laser oscillation unit 12.

By supplying a drive current to the semiconductor laser pumping unit 40 in the laser machining system 100, the semiconductor laser pumping unit 40 emits pump light toward the laser oscillator 21. The pump light puts the laser medium in the laser oscillator 21 to a pumped state, causing the laser oscillator 21 to irradiate the pulsed laser L. Here, in S13 the laser machining system 100 supplies the third current to the semiconductor laser pumping unit 40 under control of the laser controller 5 and the PC 7 when starting to machine the workpiece W with the pulsed laser L. Accordingly, the laser machining system 100 can reduce the time required to emit a pulsed laser L having sufficient intensity for performing machining operation (see FIG. 10).

Further, in S14 the laser machining system 100 initiates scanning of the pulsed laser L with the galvano scanner 19 when the standby period Ts has elapsed from the start of the third current supply period Tc. Therefore, the galvano scanner 19 starts scanning the pulsed laser L after the output intensity of the pulsed laser L has risen to a certain degree (see FIGS. 10 and 11). That is, since the laser machining system 100 can start machining the workpiece W with a pulsed laser L having sufficient output intensity for performing desired machining operation, the laser machining system 100 can suitably suppress a decline in machining quality of the laser irradiation start portion in the laser machining process. Accordingly, overall machining quality can be improved. Further, since the laser machining system 100 can shorten the time required to emit a pulsed laser L having sufficient output intensity for performing desired machining operation, the laser machining system 100 can reduce the time required to machine the workpiece W with the pulsed laser L. Therefore, the laser machining system 100 not only can contribute to a reduction in the time required for machining the workpiece W with the pulsed laser L, but also can improve machining quality.

In the laser machining system 100, machining conditions such as the scanning speed of the pulsed laser L and the material of the workpiece W are set through the machining condition input window 80, and control parameters corresponding to these machining conditions are set by referencing the supply current control database in S2 of FIG. 4. The control parameters include the values of drive currents such as the first current value, the values each of which indicating time duration for supplying the drive current such as the third current supply period Tc, and the like. Accordingly, the laser machining system 100 sets the amount of electric power to be supplied to the semiconductor laser pumping unit 40 by setting control parameters in accordance with the machining conditions. As a result, the laser machining system 100 can suitably suppress a decline in machining quality of the laser irradiation start portion machined with the pulsed laser L, thereby improving the overall machining quality.

As illustrated in FIGS. 6 and 7, the PC 7 in the laser machining system 100 can accept a setting for the scanning speed of the pulsed laser L as the machining condition and can set control parameters by extracting the parameters corresponding to the set scanning speed of the pulsed laser L from the supply current control database. Since different scanning speeds of the pulsed laser L produce different heat inputs per unit area on the workpiece W, these scanning speeds affect the machining quality of the workpiece W. Therefore, by setting control parameters corresponding to the machining condition for the scanning speed of the pulsed laser L, the laser machining system 100 can suitably suppress a decline in machining quality of the laser irradiation start portion when machining the workpiece W with the pulsed laser L, thereby improving the overall machining quality.

Further, the PC 7 in the laser machining system 100 can also accept a setting for the material of the workpiece W as the machining condition and can set control parameters by extracting parameters corresponding to the set material of the workpiece W from the supply current control database. Since different materials of workpieces W have different physical properties such as optical absorptance and heat conductivity, the material of the workpiece W affects the machining quality of the workpiece W with the pulsed laser L. Therefore, by setting control parameters corresponding to the machining condition for the material of the workpiece W, the laser machining system 200 can suitably suppress a decline in machining quality of the laser irradiation start portion in the laser machining process when machining the workpiece W with the pulsed laser L, thereby improving the overall machining quality.

With the laser machining system 100, in S17 the CPU 71 of the PC 7 determines whether the first current supply period Ta started at the end of the second current supply period Tb is longer than a prescribed period. When the first current supply period Ta, which is an idle period during the laser machining process, has continued for the prescribed period or greater (S17: YES), in S12 the CPU 71 supplies the third current to the semiconductor laser pumping unit 40 as the initial drive current. Once the standby period Ts has elapsed within the third current supply period Tc, in S14 the CPU 71 starts scanning the pulsed laser L.

Here, there is a high probability that the laser medium in the laser oscillator 21 has transited from a pumped state to a ground state if the idle period continues even after the prescribed period has elapsed. In such cases, insufficient output intensity of the pulsed laser L may lead to a decline in machining quality.

For this reason, in S17 the CPU 71 in the laser machining system 100 determines whether the first current supply period Ta is longer than the prescribed period. When the first current supply period Ta constituting the idle period has elapsed for the prescribed period or greater (S17: YES), in S12 the CPU 71 supplies the third current to the semiconductor laser pumping unit 40 as the initial drive current, thereby reducing the amount of time required for emitting a pulsed laser L having sufficient output intensity for machining Further, in any case, in S14 the CPU 71 controls the galvano scanner 19 to start scanning the pulsed laser L once the standby period Ts has elapsed after the start of the third current supply period Tc. Accordingly, the CPU 71 can start scanning the pulsed laser L with the galvano scanner 19 after the output intensity of the pulsed laser L has been increased to a certain degree (see FIGS. 10 and 11). That is, the laser machining system 100 can suppress a decline in machining quality of the laser irradiation start portion in the laser machining process even when the first current supply period Ta, i.e., the idle period, has continued for a prescribed period or greater in the laser machining system 100 (S17: YES), thereby improving the overall machining quality.

As illustrated in FIG. 7, while the time duration of the third current supply period Tc varies for different scanning speeds of the pulsed laser L in the supply current control database on the laser machining system 100, the standby period Ts is maintained at the same prescribed value. In other words, in the laser machining system 100, the time duration of the third current supply period Tc is modified so that the time duration of the standby period Ts is maintained when setting the third current supply period Tc in accordance with the machining conditions in S2. Accordingly, the laser machining system 100 can ensure a sufficient standby period Ts for increasing the output intensity of the pulsed laser L, thereby suppressing a decline in machining quality of the laser irradiation start portion in the laser machining process.

Further, the functions of the embodiment described above are implemented on the PC 7 of the laser machining system 100 by reading the laser beam machining program (see FIG. 4), the supply current control program (see FIG. 5), and the supply current control database (see FIG. 7) from the HDD 75 and executing the programs. Therefore, the laser beam machining program and the like described above function as the set of program instructions for the laser machining apparatus and the method for controlling the laser machining apparatus in the present disclosure and can obtain the same effects as the laser machining system 100 described above.

Second Embodiment

Next, a second embodiment that differs from the first embodiment described above will be described in detail while referring to the accompanying drawings. Note that the laser machining apparatus 1 according to the second embodiment has the same basic structure as the laser machining apparatus 1 according to the first embodiment described above and the second embodiment differs only in the process implemented by the supply current control program. Therefore, structures and processes similar to those described in the first embodiment will not be described below.

Detailed Description of the Supply Current Control Program According to the Second Embodiment Next, steps in the process implemented by the supply current control program according to the second embodiment will be described while referring to FIG. 12. The CPU 71 reads the supply current control program from the HDD 75 and executes the program upon advancing to the supply current control process in S6 of the laser machining process of FIG. 4 according to the second embodiment.

Figure 12:
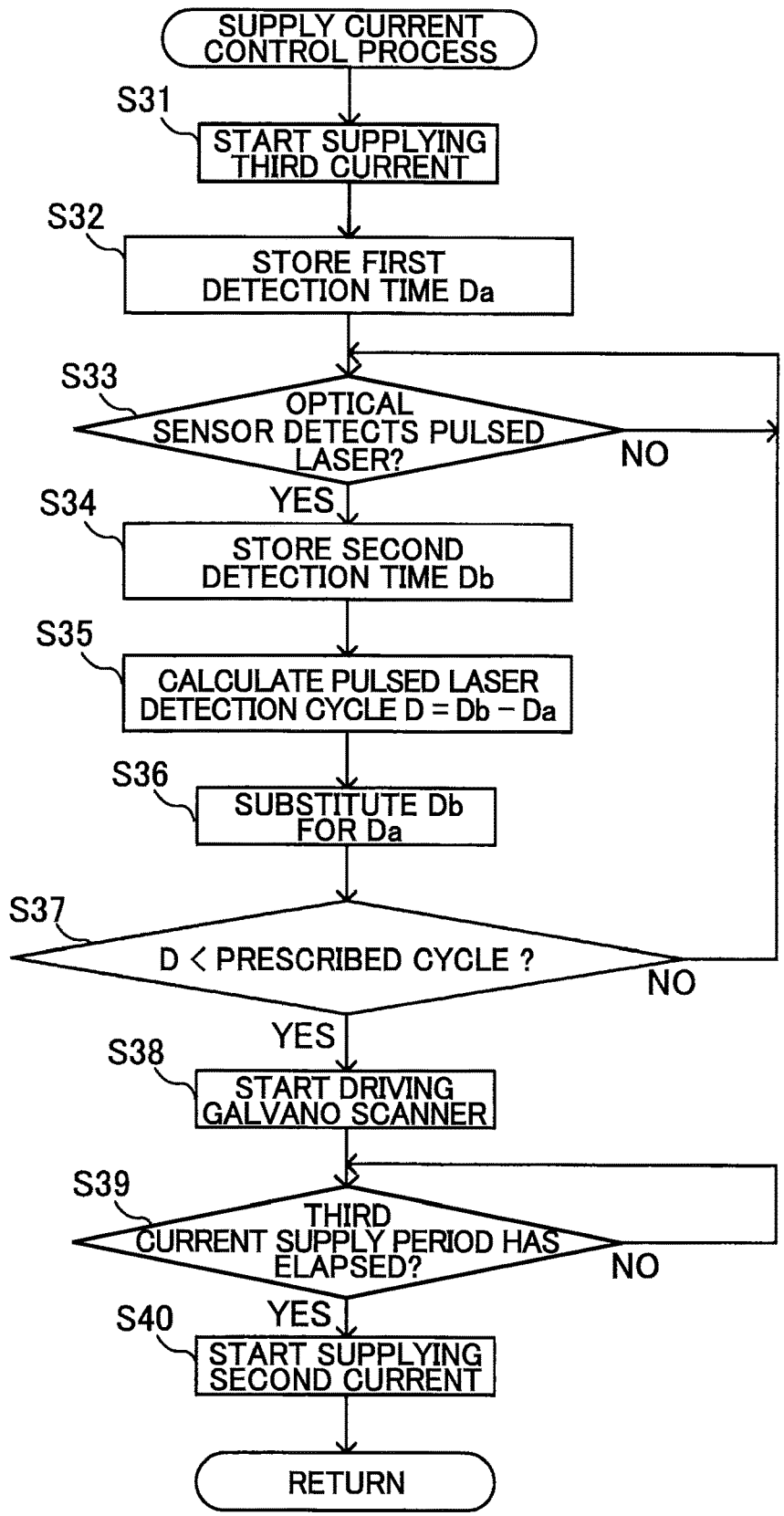
FIG. 12 is a flowchart illustrating steps in a supply current control process implemented by a supply current control program executed on the PC in the laser machining system according to a second embodiment.

As illustrated in FIG. 12, in S31 of the supply current control process the CPU 71 starts supplying the third current to the semiconductor laser pumping unit 40 while simultaneously starting the third current supply period Tc. Since the third current specifies a current value greater than that of the second current, the CPU 71 can increase the output level of the pump light to more quickly output a pulsed laser L having intensity capable of machining the workpiece W. After starting the third current supply period Tc and starting to supply the third current, the CPU 71 advances to S32.

As in the first embodiment, the standby period Ts is also simultaneously started with the start of the third current supply period Tc in the second embodiment. Hence, the galvano scanner 19 does not start scanning the irradiating position of the pulsed laser L at the timing of S31, but maintains the irradiating position of the pulsed laser L at the start point for the current line segment in the laser machining process.

In S32 the CPU 71 stores the start time at which the CPU 71 started supplying the third current to the semiconductor laser pumping unit 40 in the RAM 72 as a first detection time Da. After storing the first detection time Da in the RAM 72, the CPU 71 advances to S33.

In S33 the CPU 71 determines whether the optical sensor 18 has detected the pulsed laser L on the basis of whether a detection signal has been received from the optical sensor 18. As described above, the optical sensor 18 detects a portion of the pulsed laser L emitted from the laser oscillation unit 12 that is separated by the half mirror 15 and reflected by the reflection mirror 17. When the optical sensor 18 detects the pulsed laser L (S33: YES), the CPU 71 advances to S34. However, if the optical sensor 18 has not detected the pulsed laser L (S33: NO), the CPU 71 waits until the optical sensor 18 has detected the pulsed laser L.

In S34 the CPU 71 stores the time at which the optical sensor 18 detects the pulsed laser L in the RAM 72 as a second detection time Db. After storing the second detection time Db in the RAM 72, the CPU 71 advances to S35.

In S35 the CPU 71 reads the first detection time Da and the second detection time Db stored in the RAM 72 and calculates a pulsed laser detection cycle D by subtracting the value of the first detection time Da from the value of the second detection time Db. The CPU 71 then stores the pulsed laser detection cycle D in the RAM 72 and advances to S36.

In S36 the CPU 71 substitutes the value of the second detection time Db used to calculate the current pulsed laser detection cycle D for the first detection time Da in the equation to be used to calculate the next pulsed laser detection cycle D. Subsequently, the CPU 71 advances to S37.

In S37 the CPU 71 determines whether the pulsed laser detection cycle D calculated in S35 is smaller than a prescribed cycle. The prescribed cycle in this case is determined by the frequency of the pulsed laser L when the pulsed laser L is outputted at a stable intensity for machining. If the pulsed laser detection cycle D is smaller than the prescribed cycle (S37: YES), the CPU 71 determines that the pulsed laser L is outputted at a stable intensity for machining and advances to S38. However, if the pulsed laser detection cycle D is greater than or equal to the prescribed cycle (S37: NO), the CPU 71 returns to S33 and executes the process from S33 to S36 for calculating the pulsed laser detection cycle D again.

In S38 the CPU 71 determines that the pulsed laser L is outputted at a stable intensity for machining since the pulsed laser detection cycle D is smaller than the prescribed cycle and therefore outputs, to the galvano controller 56, a control command instructing the galvano controller 56 to start driving the galvano scanner 19. Since the galvano scanner 19 starts scanning the pulsed laser L to start performing laser machining the workpiece W when the control command is inputted into the gavano controller 56, the standby period Ts in the third current supply period Tc ends at this time. Subsequently, the CPU 71 advances to S39.

This timing falls within the third current supply period Tc during which the third current is supplied to the semiconductor laser pumping unit 40, and hence corresponds to a timing within the operating period Tm described above. Therefore, since the galvano scanner 19 scans the irradiating position of the pulsed laser L while the laser oscillator 21 is emitting the pulsed laser L having intensity capable of machining, the machining of the workpiece W with the pulsed laser L is also started.

In S39 the CPU 71 determines whether the third current supply period Tc has elapsed. As in the first embodiment, the time duration of the third current supply period Tc in the second embodiment is specified by the value of "third current supply period Tc" set as one of the control parameters in S2 according to the machining conditions and the supply current control database (see FIG. 7). When the third current supply period Tc has elapsed (S39: YES), the CPU 71 advances to S40. However, if the third current supply period Tc has not elapsed (S39: NO), the CPU 71 waits until the third current supply period Tc has elapsed. Since the timing in this case corresponds to the operating period Tm within the third current supply period Tc, the machining of the workpiece W with the pulsed laser L is continued until the third current supply period Tc has elapsed.

In S40 the CPU 71 changes the drive current supplied to the semiconductor laser pumping unit 40 from the third current to the second current with the elapse of the third current supply period Tc, thereby starting the second current supply period Tb. Since the galvano scanner 19 continues scanning the pulsed laser L at this time, the machining of the workpiece W with the pulsed laser L is continued. After the CPU 71 starts supplying the second current to the semiconductor laser pumping unit 40, the CPU 71 quits the supply current control program according to the second embodiment and advances to S7 in the laser machining process of FIG. 4.

Operations in a Laser Machining Process According to the Second Embodiment

Next, detailed operations implemented on the laser machining system 100 according to the second embodiment when performing laser machining will be described with reference to FIG. 13.

In the following description, it will be assumed that steps from Si to S4 have been completed in the laser machining process of FIG. 4 and that control parameters such as the time duration of the third current supply period Tc and the like have been set in accordance with the machining conditions. Subsequently, the irradiating position of the pulsed laser L arrives at the process-start position, and the CPU 71 ends the first current supply period Ta and advances to the supply current control process of S6 according to the second embodiment.

In the supply current control process according to the second embodiment, the CPU 71 first begins supplying the third current to the semiconductor laser pumping unit 40. Since the semiconductor laser pumping unit 40 inputs pump light corresponding to the third current into the laser medium of the laser oscillator 21 via the optical fiber F as a consequence, the laser oscillator 21 starts emitting the pulsed laser L in a cycle.

Next, at the start of the third current supply period Tc in the second embodiment, the CPU 71 measures the first detection time Da in S32 and the second detection time Db in S34 and uses these values to calculate the pulsed laser detection cycle D in S35.

As shown in FIG. 13, the output intensity of the pulsed laser L irradiated toward the workpiece W gradually increases each time the pulsed laser detection cycle D is calculated and stabilizes at the output intensity capable of performing stable laser machining after the pulsed laser detection cycle D has been calculated for a certain number of times. In the example illustrated in FIG. 13, each of the pulsed laser detection cycles D calculated for the first through fifth times is longer than the prescribed cycle (S37: NO). In this case, the output intensity of the pulsed lasers is smaller than the intensity required for performing stable laser machining Thus, the laser machining system 100 according to the second embodiment does not start scanning with the galvano scanner 19 in this state.

On the other hand, each of the pulsed laser detection cycles D calculated for the sixth and subsequent times is shorter than the prescribed cycle (S37: YES). In this case, the output intensity of the pulsed laser L exceeds the intensity required for performing stable laser machining (see FIG. 13). Hence, in the second embodiment, the CPU 71 starts scanning with the galvano scanner 19 in S38 upon calculating the sixth pulsed laser detection cycle D. In other words, this timing marks the end of the standby period Ts in the third current supply period Tc and the transition to the operating period Tm in the second embodiment.

At this timing, the output intensity of the pulsed laser L has stabilized at a level exceeding the intensity required for performing stable laser machining Therefore, the laser machining system 100 according to the second embodiment does not produce machining defects due to insufficient intensity of the pulsed laser L when the scanning of the workpiece W with the pulsed laser L is started. Further, in the laser machining system 100 according to the second embodiment, the CPU 71 calculates the pulsed laser detection cycle D using actual detection results received from the optical sensor 18 when the optical sensor 18 detects the pulsed laser L, and sets the end point of the standby period Ts in the third current supply period Tc (the timing for initiating scanning with the galvano scanner 19). Therefore, the CPU 71 can allocate a more suitable standby period Ts, thereby suppressing a decline in machining quality of the laser irradiation start portion in the laser machining process.

In the laser machining system 100 according to the second embodiment, as described above, the laser machining apparatus 1 has the laser oscillation unit 12, the galvano scanner 19, the fθ lens 20, and the guide optical section 16, and is connected to the laser controller 5, the power supply unit 6, and the PC 7. According to this laser machining apparatus 1, the pulsed laser L irradiated from the laser oscillation unit 12 can be scanned by the galvano scanner 19 and the fθ lens 20 to machine the surface of the workpiece W.

According to the laser machining system 100 described above, when the machining of the workpiece W with the pulsed laser L is started, in S31 the third current is supplied to the semiconductor laser pumping unit 40 under control of the laser controller 5 and the PC 7. Accordingly, as in the first embodiment, the laser machining system 100 can shorten the time duration required for irradiating the pulsed laser L having sufficient output intensity for machining.

Further, according to the laser machining system 100 described above, as in the first embodiment, when the standby period Ts has elapsed from the start of the third current supply period Tc, in S38 the galvano scanner 19 starts scanning the pulsed laser L. Thus, the galvano scanner 19 starts scanning the pulsed laser L after the output intensity of the pulsed laser L has risen to a certain degree (see FIG. 13). In other words, since the laser machining system 100 can start machining the workpiece W with the pulsed laser L having sufficient output intensity for performing the desired machining, the laser machining system 100 can suppress a decline in machining quality of the laser irradiation start portion in the laser machining process. Therefore, the overall machining quality can be improved. Further, since the laser machining system 100 can shorten the time duration required for emitting a pulsed laser L having output intensity capable of performing the desired machining, the laser machining system 100 can shorten the time duration required for machining the workpiece W with the pulsed laser L. Hence, the laser machining system 100 can contribute both to reducing the necessary time required for machining the workpiece W and to improving machining quality.

With the laser machining system 100 described above, machining conditions such as the scanning speed of the pulsed laser L and the material of the workpiece W are set through the machining condition input window 80, and in S2 control parameters are set in accordance with these machining conditions by referencing the supply current control database. The control parameters include the values of drive currents such as the first current value, the third current supply period Tc indicating the time duration for supplying the drive current, and the like. Accordingly, the laser machining system 100 sets the amount of electric power to be supplied to the semiconductor laser pumping unit 40 by setting the control parameters in accordance with the machining conditions. As a result, the laser machining system 100 can suitably suppress a decline in machining quality of the laser irradiation start portion machined with the pulsed laser L, thereby improving the overall machining quality.

As in the first embodiment described above, the laser machining system 100 according to the second embodiment can accept a setting for the scanning speed of the pulsed laser L as a machining condition and can set control parameters in accordance with the scanning speed by extracting the parameters from the supply current control database (see FIGS. 6 and 7). By setting the control parameters in accordance with the scanning speed of the pulsed laser L, the laser machining system 100 can suitably suppress a decline in machining quality of the laser irradiation start portion in the laser machining operation of the workpiece W with the pulsed laser L, thereby improving the overall machining quality.

As in the first embodiment, the laser machining system 100 according to the second embodiment can also accept a setting for the material of the workpiece W as a machining condition and can set control parameters in accordance with this material by extracting the parameters from the supply current control database. By setting the control parameters in accordance with the material of the workpiece W, the laser machining system 100 can suitably suppress a decline in machining quality of the laser irradiation start portion in the laser machining operation of the workpiece W with the pulsed laser L, thereby improving the overall machining quality.

Subsequently, the laser machining system 100 according to the second embodiment sets the time duration of the standby period Ts within the third current supply period Tc on the basis of the property of the pulsed laser L (i.e., the pulsed laser detection cycle D) measured by the optical sensor 18 in S38. Hence, by measuring the actual property of the pulsed laser L using the optical sensor 18, the laser machining system 100 can identify the output intensity of the pulsed laser L and can set the time duration of the standby period Ts to correspond to this intensity. Accordingly, the laser machining system 100 can machine the workpiece W with a pulsed laser L having sufficient output intensity, thereby suppressing a decline in machining quality of the laser irradiation start portion in the laser machining process.

As shown in FIG. 13, the laser oscillator 21 of the laser oscillation unit 12 is configured to emit the pulsed laser L in a cycle. When these cycles are long, the output intensity of the pulsed laser L tends to be insufficient for machining the workpiece W. However, since the time duration of the standby period Ts is set to a period so that the pulsed laser detection cycle D measured by the optical sensor 18 is not greater than a prescribed cycle (S37: YES), the laser machining system 100 according to the second embodiment can start machining the workpiece W with the pulsed laser L having sufficient output intensity for machining, thereby suppressing a decline in machining quality of the laser irradiation start portion in the laser machining process.

In the second embodiment, the standby period Ts set by executing the processes from S32 to S37 is configured to be an interval of at least twenty μsec. Hence, in the second embodiment, the optical sensor 18 can reliably measure the pulsed laser detection cycle D, and the timing at which the pulsed laser L has sufficient output intensity for machining the workpiece W can be reliably identified. As a result, the laser machining system 100 of the second embodiment can start machining the workpiece W using the pulsed laser L having sufficient output intensity for machining, thereby suppressing a decline in machining quality of the laser irradiation start portion in the laser machining process.

Note that, in the embodiments described above, the laser machining system 100 and the laser machining apparatus 1 are examples of the laser machining apparatus of the present disclosure. The laser oscillation unit 12 is an example of the laser beam emitting device of the present disclosure. The semiconductor laser pumping unit 40 is an example of the pump light emitting device of the present disclosure. The galvano scanner 19 is an example of the scanner of the present disclosure. The PC 7, the laser controller 5, the control unit 70, the HDD 75, the input manipulation unit 76, and the machining condition input window 80 are examples of the controller of the present disclosure. The optical sensor 18 is an example of the detector of the present disclosure. The third current is an example of the initial drive current of the present disclosure. The second current is an example of the prescribed drive current of the present disclosure. The third current supply period Tc is an example of the initial drive current supply period of the present disclosure. The standby period Ts is an example of the standby period of the present disclosure. The first current supply period Ta is an example of the idle period of the present disclosure.

While the description has been made in detail with reference to specific embodiments, it would be apparent to those skilled in the art that various changes and modifications may be made thereto. For example, while the machining conditions are inputted and set through the PC 7, and the PC 7 specifies the control parameters in accordance with the machining conditions in the embodiments described above (S2), the present disclosure is not limited to this configuration. For example, the PC 7 may simply be used for setting the machining conditions, while the control parameters in accordance with the machining conditions may be set on the laser controller 5.

Further, while the amount of electric power to be supplied to the semiconductor laser pumping unit 40 within the third current supply period Tc is changed by modifying the time duration of the third current supply period Tc in the embodiments described above, the present disclosure is not limited to this configuration provided that the amount of electric power supplied to the semiconductor laser pumping unit 40 can be modified. For example, the amount of electric power may be changed by modifying the current value of the third current while maintaining the length of the third current supply period Tc. Alternatively, both the time duration of the third current supply period Tc and the current value of the third current may be modified.

The machining conditions and the control parameters described in the above embodiments are merely examples, and additional machining conditions and control parameters may be employed. By using a larger number of machining conditions and control parameters, it is possible to more suitably suppress a decline in machining quality of the laser irradiation start portion in the laser machining process.

What is claimed is:

1. A laser machining apparatus comprising:
a pump light emitting device configured to emit pump light upon receipt of a drive current, the pump light having intensity corresponding to a current value of the drive current;
a laser beam emitting device configured to transit to a pumped state to emit a laser beam for machining a workpiece when the pump light is incident from the pump light emitting device, the laser beam emitting device being configured to emit the laser beam having prescribed beam intensity during machining the workpiece;
a scanner configured to scan the laser beam emitted from the laser beam emitting device at a scanning speed; and
a controller configured to perform:
  (a) supplying an initial drive current having an initial drive current value to the pump light emitting device during an initial drive current supply period, the initial drive current supply period being made up with a first period and a second period subsequent to the first period, the first period being shorter than the initial drive current supply period, the pump light emitting device emitting the pump light having initial light intensity upon receipt of the initial drive current;
  (b) controlling the scanner to start scanning the laser beam after the first period has elapsed from a start of supplying the initial drive current in (a); and
  (c) supplying a prescribed drive current having a prescribed drive current value to the pump light emitting device after the second period has elapsed from a start of scanning the laser beam in (b), the prescribed drive current value being smaller than the initial drive current value, the pump light emitting device emitting the pump light having prescribed light intensity upon receipt of the prescribed drive current, the laser beam emitting device emitting the laser beam having the prescribed beam intensity when the pump light having the prescribed light intensity is incident upon the laser beam emitting device.

2. The laser machining apparatus according to claim 1, wherein the controller is configured to further perform:
  (d) accepting data related to machining conditions; and
  (e) determining an amount of electric power to be supplied to the pump light emitting device in accordance with the machining conditions.

3. The laser machining apparatus according to claim 2, wherein the machining conditions include the scanning speed of the scanner.

4. The laser machining apparatus according to claim 2, wherein the machining conditions include a material of the workpiece.

5. The laser machining apparatus according to claim 2, wherein the controller is configured to further perform:
  (f) changing the initial drive current supply period in accordance with the determined amount of the electric power by changing the second period while maintaining the first period.

6. The laser machining apparatus according to claim 1, wherein the controller is configured to further perform:
  (g) determining whether machining of the workpiece with the laser beam has been performed;
  (h) in response to determining that the machining has been performed, determining whether a predetermined idle period starting from an end of the machining has elapsed;
  (i) in response to determining that the predetermined idle period has elapsed, supplying the initial drive current to the pump light emitting device during the initial drive current supply period; and
  (j) controlling the scanner to start scanning the laser beam after the first period has elapsed from a start of supplying the initial drive current in (i).

7. The laser machining apparatus according to claim 1, further comprising a detector configured to detect a property of the laser beam emitted from the laser beam emitting device;
wherein the controller is configured to further perform:
  (k) determining the first period in accordance with the property of the laser beam.

8. The laser machining apparatus according to claim 7, wherein the laser beam emitting device is configured to emit the laser beam in a cycle,
wherein the detector is configured to detect a cycle of the laser beam, and
wherein the first period is determined so that the cycle of the laser beam is smaller than a prescribed cycle.

9. The laser machining apparatus according to claim 8, wherein the first period is longer than 20 μsec.

10. A non-transitory computer readable storage medium storing a set of program instructions for a laser machining apparatus including: a pump light emitting device configured to emit pump light upon receipt of a drive current, the pump light having intensity corresponding to a current value of the drive current; a laser beam emitting device configured to transit to a pumped state to emit a laser beam for machining a workpiece when the pump light is incident from the pump light emitting device, the laser beam emitting device being configured to emit the laser beam having prescribed beam intensity during machining the workpiece; a scanner configured to scan the laser beam emitted from the laser beam emitting device; and a controller, the set of program instructions, when executed by the controller, causing the laser machining apparatus to perform:

(a) supplying an initial drive current having an initial drive current value to the pump light emitting device during an initial drive current supply period, the initial drive current supply period being made up with a first period and a second period subsequent to the first period, the first period being shorter than the initial drive current supply period, the pump light emitting device emitting the pump light having initial light intensity upon receipt of the initial drive current;

(b) controlling the scanner to start scanning the laser beam after the first period has elapsed from a start of supplying the initial drive current in (a), and (c) supplying a prescribed drive current having a prescribed drive current value to the pump light emitting device after the second period has elapsed from a start of scanning the laser beam in (b), the prescribed drive current value being smaller than the initial drive current value, the pump light emitting device emitting the pump light having prescribed light intensity upon receipt of the prescribed drive current, the laser beam emitting device emitting the laser beam having the prescribed beam intensity when the pump light having the prescribed light intensity is incident upon the laser beam emitting device.

11. A method for controlling a laser machining apparatus including: a pump light emitting device configured to emit pump light upon receipt of a drive current, the pump light having intensity corresponding to a current value of the drive current; a laser beam emitting device configured to transit to a pumped state to emit a laser beam for machining a workpiece when the pump light is incident from the pump light emitting device, the laser beam emitting device being configured to emit the laser beam having prescribed beam intensity during machining the workpiece; a scanner configured to scan the laser beam emitted from the laser beam emitting device; and a controller, the method comprising:

(a) supplying an initial drive current having an initial drive current value to the pump light emitting device during an initial drive current supply period, the initial drive current supply period being made up with a first period and a second period subsequent to the first period, the first period being shorter than the initial drive current supply period, the pump light emitting device emitting the pump light having initial light intensity upon receipt of the initial drive current;

(b) controlling the scanner to start scanning the laser beam after the first period has elapsed from a start of supplying the initial drive current in (a), and (c) supplying a prescribed drive current having a prescribed drive current value to the pump light emitting device after the second period has elapsed from a start of scanning the laser beam in (b), the prescribed drive current value being smaller than the initial drive current value, the pump light emitting device emitting the pump light having prescribed light intensity upon receipt of the prescribed drive current, the laser beam emitting device emitting the laser beam having the prescribed beam intensity when the pump light having the prescribed light intensity is incident upon the laser beam emitting device.

\* \* \* \* \*